(12) United States Patent
Wessels

(10) Patent No.: US 10,066,784 B2
(45) Date of Patent: Sep. 4, 2018

(54) FOLDING HANDHELD DEVICE HOLDING SYSTEM

(71) Applicant: Peter H. Wessels, Bettendorf, IA (US)

(72) Inventor: Peter H. Wessels, Bettendorf, IA (US)

( * ) Notice: Subject to any disclaimer, the term of this patent is extended or adjusted under 35 U.S.C. 154(b) by 0 days.

(21) Appl. No.: 15/592,336

(22) Filed: May 11, 2017

(65) Prior Publication Data

US 2017/0328517 A1 Nov. 16, 2017

Related U.S. Application Data

(60) Provisional application No. 62/335,354, filed on May 12, 2016.

(51) Int. Cl.
*B41J 11/02* (2006.01)
*F16M 13/02* (2006.01)
*F16B 1/00* (2006.01)

(52) U.S. Cl.
CPC .............. *F16M 13/022* (2013.01); *F16B 1/00* (2013.01); *F16B 2001/0035* (2013.01)

(58) Field of Classification Search
CPC .. F16M 13/022; F16B 1/00; F16B 2001/0035
USPC ......................... 248/205.3, 206.3, 442.2, 918
See application file for complete search history.

(56) References Cited

U.S. PATENT DOCUMENTS

| 5,074,512 | A | * | 12/1991 | Gianforcaro, II | B41J 29/15 248/279.1 |
| 5,499,793 | A | * | 3/1996 | Salansky | A47B 81/06 160/24 |
| 5,619,395 | A | * | 4/1997 | McBride | G06F 1/1607 248/214 |
| 8,055,009 | B2 | * | 11/2011 | Porter | H04R 5/02 248/918 |
| 8,317,146 | B2 | * | 11/2012 | Jung | G06F 1/1601 248/125.7 |
| 9,660,466 | B2 | * | 5/2017 | Ergun | H02J 7/0044 |
| 2016/0260532 | A1 | * | 9/2016 | Baca | H01F 7/0252 |
| 2017/0264725 | A1 | * | 9/2017 | Holder | H04M 1/11 |

\* cited by examiner

*Primary Examiner* — Gwendolyn Wrenn Baxter
(74) *Attorney, Agent, or Firm* — Christopher A. Proskey; BrownWinick Law Firm

(57) ABSTRACT

A folding handheld device holding system comprises a connecting arm with a connection section which includes an adhesive. An extension arm is connected to the connecting arm by a hinge having a hinge pin. The extension arm extends outwardly from the hinge and connecting section and includes a holding section having a recess therein that receives a cover and at least one magnet therein. In one arrangement, the at least one magnet consists of a plurality of magnets. A device, such as a smart phone or a tablet, is connected to the folding handheld device holding system.

16 Claims, 22 Drawing Sheets

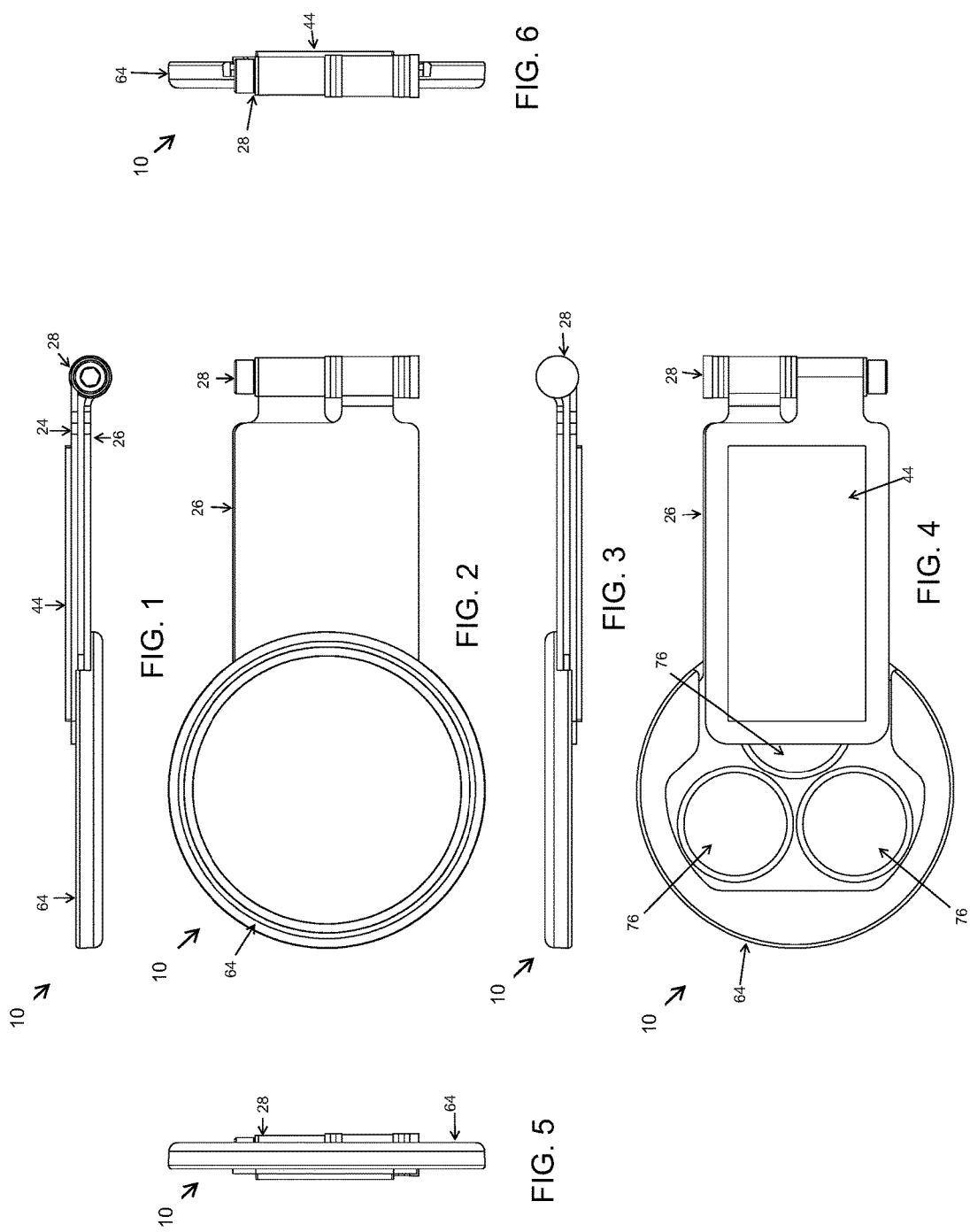

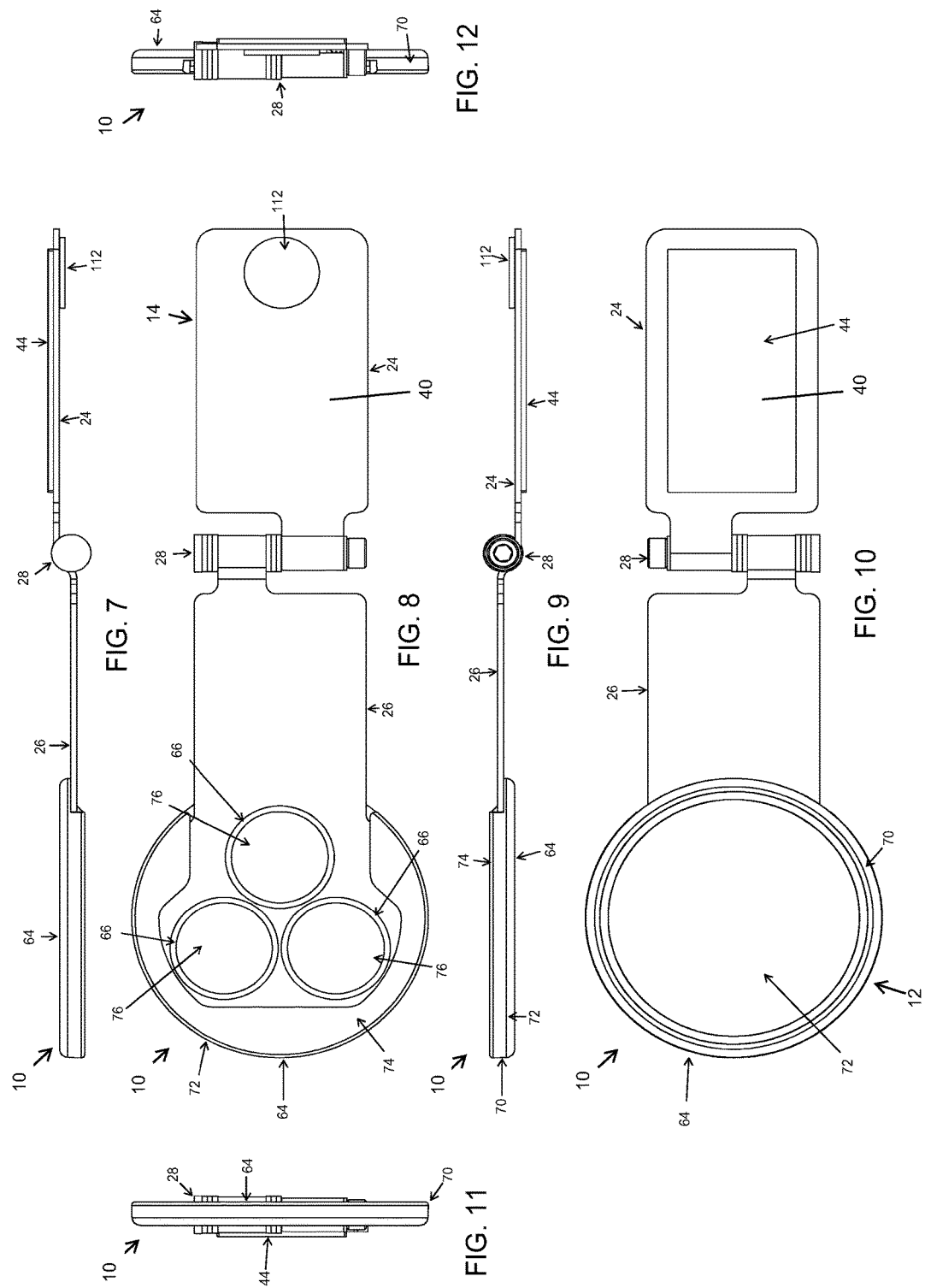

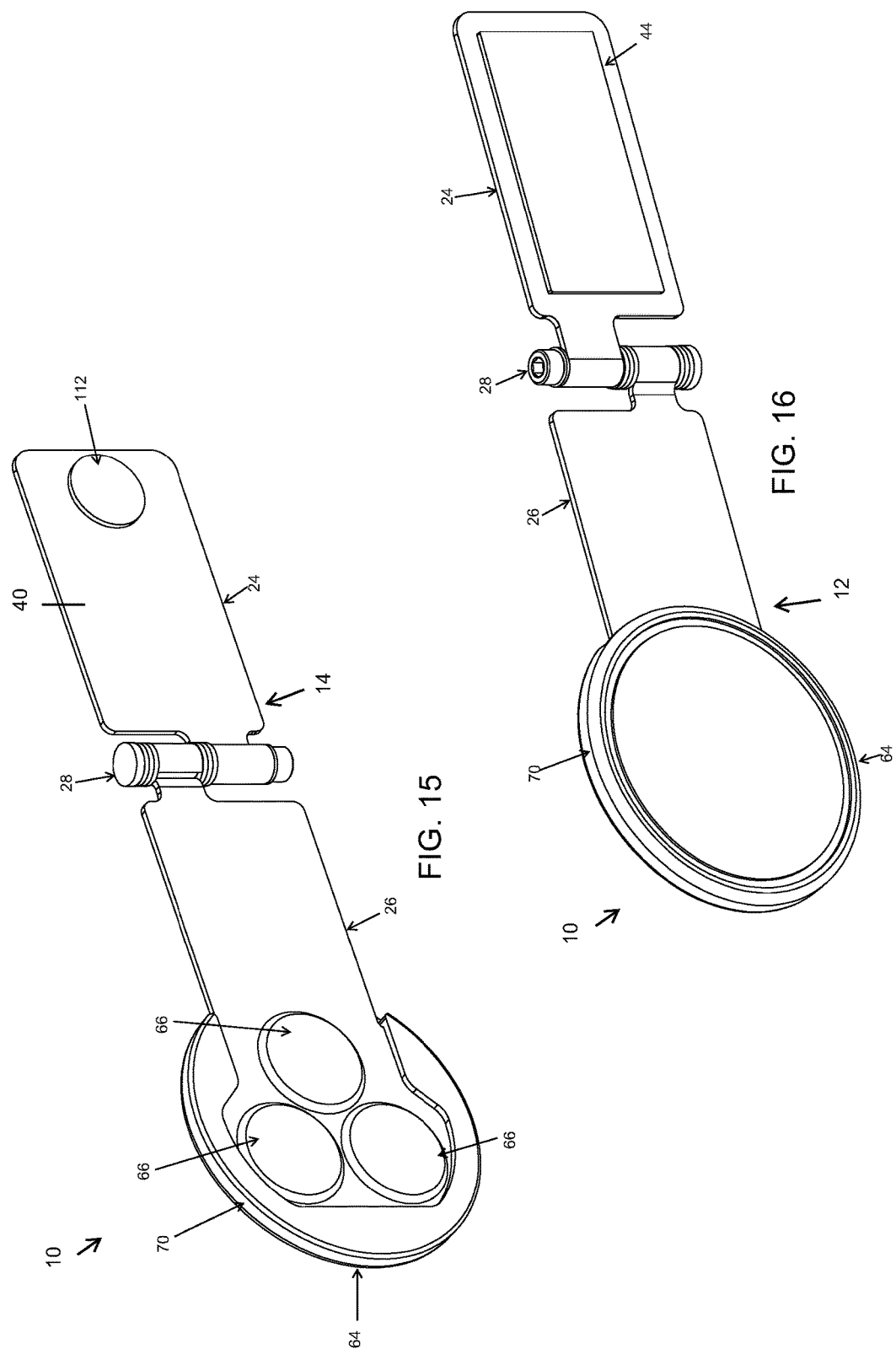

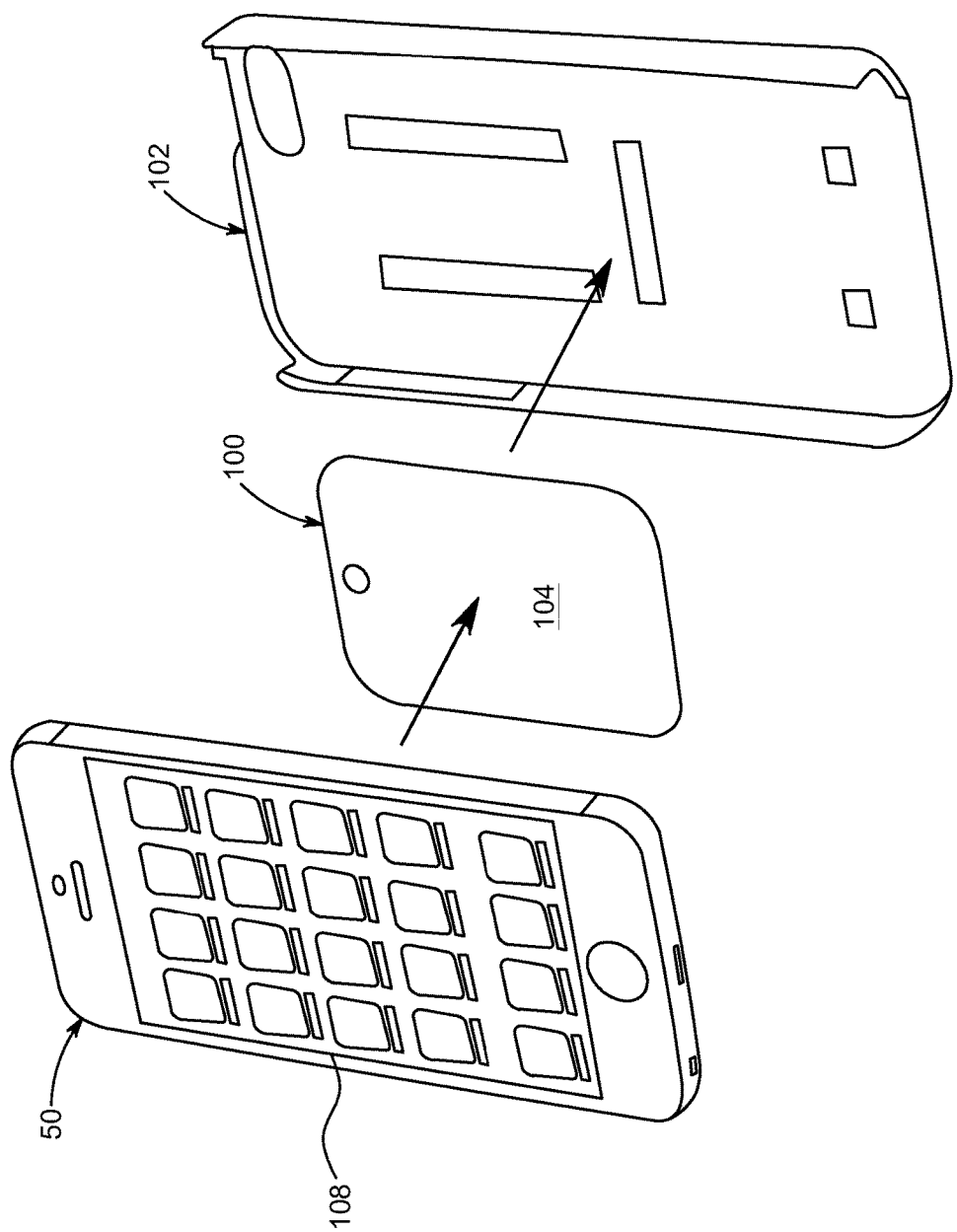

FOLDING HANDHELD DEVICE HOLDING SYSTEM

FIELD OF THE DISCLOSURE

This disclosure relates to a device holding system. More specifically, and without limitation, this disclosure relates to a folding handheld device holding system.

BACKGROUND OF THE DISCLOSURE

With improvements in technology and advancements in manufacturing processes, a great number of handheld devices have been developed. These handheld devices include cell phones, smart phones, tablets, handheld computers, music playing devices (such as MP3 players, iPods and the like), video playing devices, videogame devices, and digital cameras, to name a few. The term "handheld device" as used herein is to be construed broadly and is meant to describe these and any other handheld electronic devices.

Adoption and use of these handheld devices, especially smart phones, has been widespread. With the ability to receive phone calls, text messages, emails (from multiple accounts), social media updates, as well as perform internet searches, among countless other functionalities, many users find themselves tethered to their handheld devices practically all day every day.

Users who rely heavily upon their handheld device tend to keep their handheld device within close proximity, even when using another computer, such as their desktop or laptop. These users tend to keep their handheld device in their pocket or purse, in a drawer, sitting upon their desk, among countless other places, as they work on their computer. Keeping their handheld device in their pocket or purse, in a drawer, or on their desk is inconvenient and inefficient for these users because their handheld device is not readily available. That is, when in their pocket or purse, in a drawer, or just sitting upon their desk, a user cannot easily see the screen of their handheld device when working on their computer. Therefore, the user must take their eyes, and attention, off of their computer in the event that they receive a phone call, text message, email, update or the like on their handheld device. This causes a time delay and a distraction, especially when the precise location of the user's handheld device is not known, such as somewhere on their cluttered desk or hidden in their purse. Furthermore, when placed in these obscure and not-easily accessible locations, a user's handheld device cannot be easily used for various functions, such as video calls, as the user must hold their handheld device while conducting the video call essentially preventing the user from doing anything else during the video call. In addition, there are many situations where a computer and a handheld device are difficult to use simultaneously, such as when a computer is used on an airplane, on a train, in cafeterias, restaurants, or coffee shops, among countless other situations.

There have been various attempts to provide devices that couple a cellphone or other device to a computer. However, each of these prior art devices suffer from various disadvantages such as being overly complex, failing to be convenient to use, failing to be usable with various devices, being bulky, being expensive, being unattractive, failing to position the cellphone in an convenient position, among countless other deficiencies. These prior art attempts include:

U.S. Pat. No. 6,888,940, U.S. Ser. No. 09/547,961, filed on Apr. 12, 2000 by Daniel Deppen entitled "Magnetic holder for cell phones and the like";

U.S. Pat. No. 6,135,408, U.S. Ser. No. 09/336,544, filed on Jun. 19, 1999 by Herbert Richter entitled "Mobile telephone holder";

U.S. Pat. No. 5,619,395, U.S. Pat. No. 428,462, filed on Apr. 25, 1995 by Jon McBride entitled "Device for attaching a wireless telephone to a portable computer"

Therefore, there is a need in the art, which are problems not solved by the prior art.

Thus, it is a primary object of the disclosure to provide a folding handheld device holding system that improves upon the state of the art.

Another object of the disclosure is to provide a folding handheld device holding system that is easy to use.

Yet another object of the disclosure is to provide a folding handheld device holding system that is small.

Another object of the disclosure is to provide a folding handheld device holding system that improves the efficiency of using a computer.

Yet another object of the disclosure is to provide a folding handheld device holding system that improves the efficiency of using a handheld device.

Another object of the disclosure is to provide a folding handheld device holding system that improves the convenience of using a computer.

Yet another object of the disclosure is to provide a folding handheld device holding system that improves the convenience of using a handheld device.

Another object of the disclosure is to provide a folding handheld device holding system that can be used with a wide variety of handheld devices.

Yet another object of the disclosure is to provide a folding handheld device holding system that can be used with a wide variety of computers.

Another object of the disclosure is to provide a folding handheld device holding system that eliminates the need to search for the location of a handheld device.

Yet another object of the disclosure is to provide a folding handheld device holding system that is relatively inexpensive.

Another object of the disclosure is to provide a folding handheld device holding system that has a long useful life.

Yet another object of the disclosure is to provide a folding handheld device holding system that has a small footprint.

Another object of the disclosure is to provide a folding handheld device holding system that is high quality.

Yet another object of the disclosure is to provide a folding handheld device holding system that is durable.

Another object of the disclosure is to provide a folding handheld device holding system that does not interfere with use of the handheld device.

Yet another object of the disclosure is to provide a folding handheld device holding system that does not interfere with use of the computer.

Another object of the disclosure is to provide a folding handheld device holding system that allows a handheld device to be quickly attached.

Yet another object of the disclosure is to provide a folding handheld device holding system that allows a handheld device to be quickly detached.

Another object of the disclosure is to provide a folding handheld device holding system that is adjustable.

Yet another object of the disclosure is to provide a folding handheld device holding system that does not require any tools to be used for assembly Another object of the disclosure is to provide a folding handheld device holding system that places a handheld device in a convenient position.

These and other objects, features, or advantages of the present disclosure will become apparent from the specification, figures, and claims.

SUMMARY OF THE DISCLOSURE

A folding handheld device holding system for use with a computer or other device is presented. The folding handheld device holding system includes a connecting arm having a connecting section includes an adhesive. An extension arm is connected to the connecting arm by a hinge having a hinge pin. The extension arm extends outwardly from the hinge and connecting section and includes a holding section having a recess therein that receives a cover and a plurality of magnets therein. The adhesive of the connecting section of the connecting arm is attached to the back side of a computer monitor in a desired position. Once attached, the extension arm moves between a retracted position, wherein the extension arm lays flat against the connecting arm and is hidden behind the monitor, and an extended position, wherein the extension arm extends away from the connecting arm and extends outwardly from behind the monitor. A metallic plate is attached to a handheld device. When in an extended position, the handheld device is magnetically attached to the holding section of the extension arm. This configuration allows a handheld device to be quickly added to and removed from a computer.

BRIEF DESCRIPTION OF THE DRAWINGS

FIG. 1 is a close-up side perspective view of a folding handheld device holding system having the connecting arm lay flat against the extension arm;

FIG. 2 is a front perspective view of a folding handheld device holding system having the connecting arm lay flat against the extension arm;

FIG. 3 is a close-up side perspective view of a folding handheld device holding system having the connecting arm lay flat against the extension arm;

FIG. 4 is a rear perspective view of a folding handheld device holding system having the connecting arm lay flat against the extension arm;

FIG. 5 is a close-up side perspective view of a folding handheld device holding system having the connecting arm lay flat against the extension arm;

FIG. 6 is a close-up side perspective view of a folding handheld device holding system having the connecting arm lay flat against the extension arm;

FIG. 7 is a close-up side perspective view of a folding handheld device holding system having the connecting arm and the extension arm in the extended position;

FIG. 8 is a rear perspective view of a folding handheld device holding system having the connecting arm and the extension arm in the extended position;

FIG. 9 is a close-up side perspective view of a folding handheld device holding system having the connecting arm and the extension arm in the extended position;

FIG. 10 is a front perspective view of a folding handheld device holding system having the connecting arm and the extension arm in the extended position;

FIG. 11 is a close-up side perspective view of a folding handheld device holding system having the connecting arm and the extension arm in the extended position;

FIG. 12 is a close-up side perspective view of a folding handheld device holding system having the connecting arm and the extension arm in the extended position;

FIG. 15 is a rear perspective view of a folding handheld device holding system having the connecting arm and the extension arm in the extended position;

FIG. 16 is a front perspective view a folding handheld device holding system having the connecting arm and the extension arm in the extended position;

FIG. 26 is a close-up perspective view of one arrangement of the manner or method of connecting a metallic member to a handheld device and a cover of the device;

DETAILED DESCRIPTION OF THE DISCLOSURE

Figure 14:
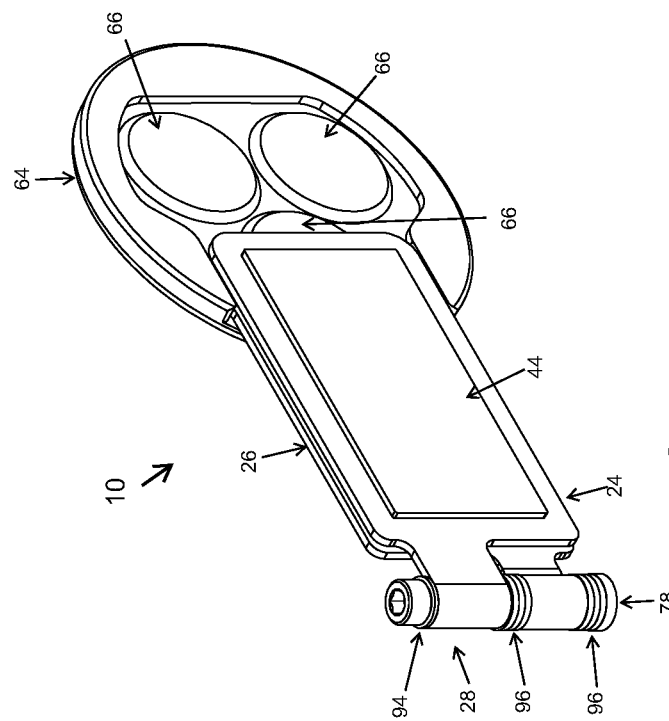
FIG. 14 is a rear perspective view of a folding handheld device holding system having the connecting arm lay flat against the extension arm.
Figure 13:
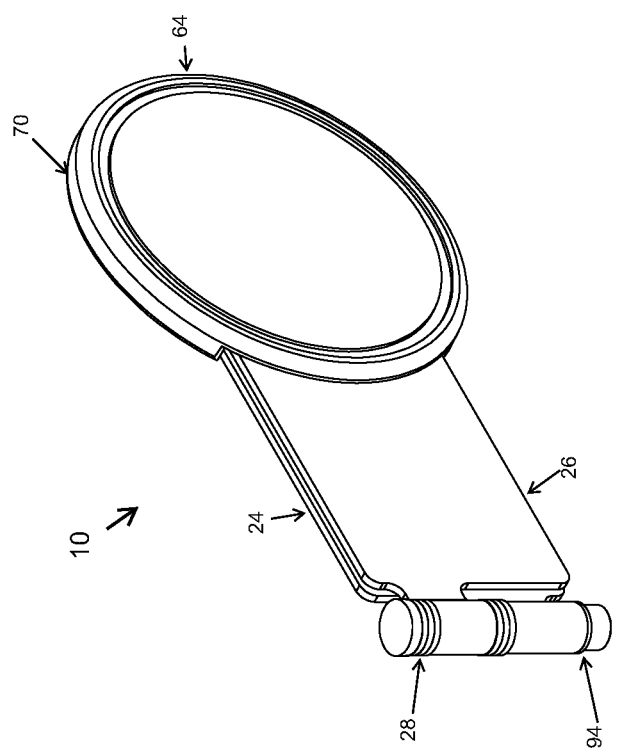
FIG. 13 is a front perspective view of a folding handheld device holding system having the connecting arm lay flat against the extension arm.
Figure 17:
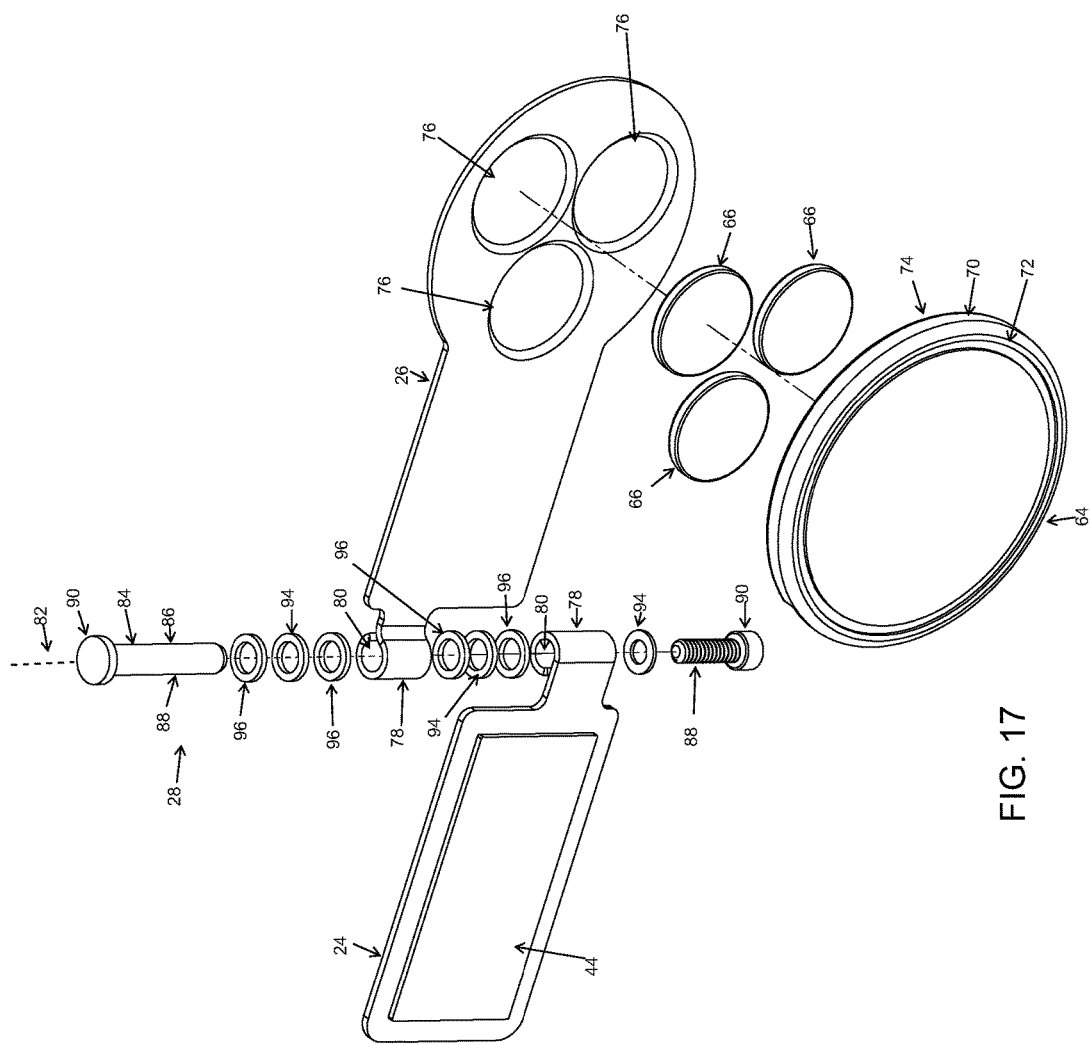
FIG. 17 is a front perspective view of the elements of a folding handheld device holding system which demonstrates how the elements are integrated with one another.
Figure 18:
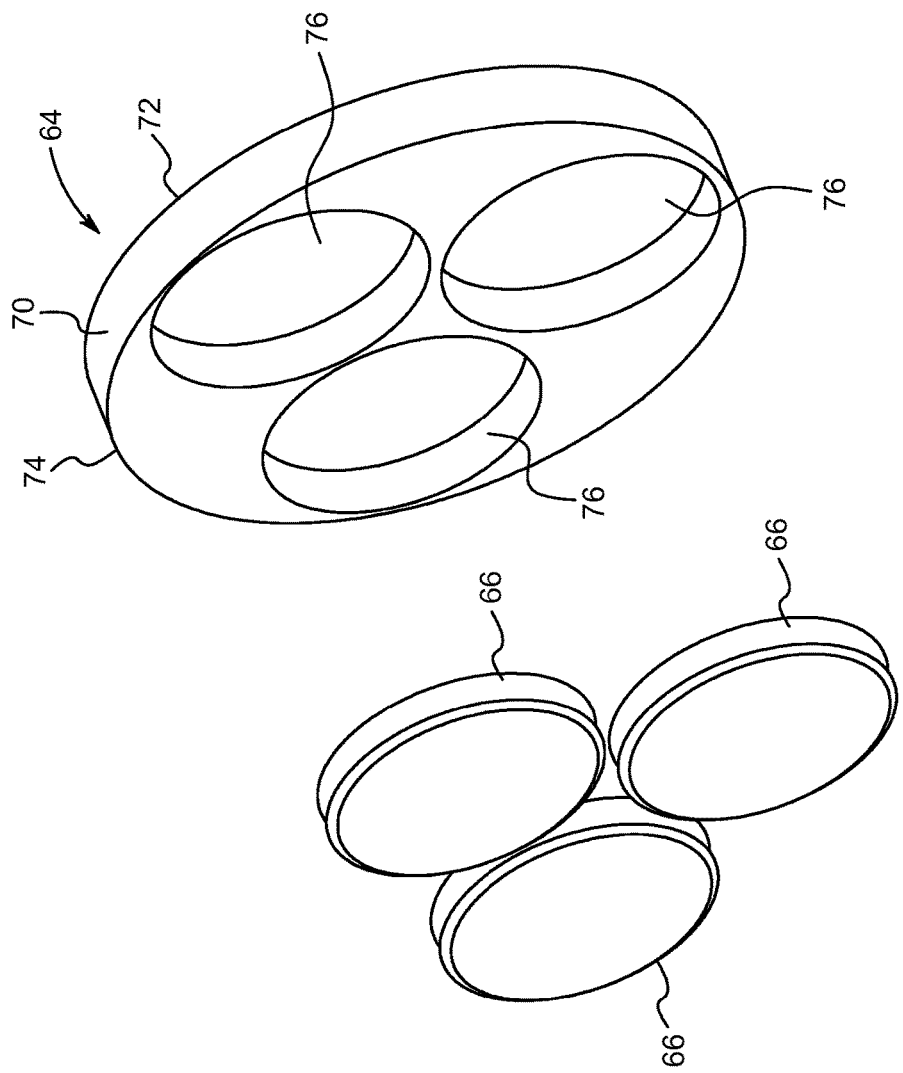
FIG. 18 is a rear perspective view of the plurality of magnets and the cover.
Figure 19:
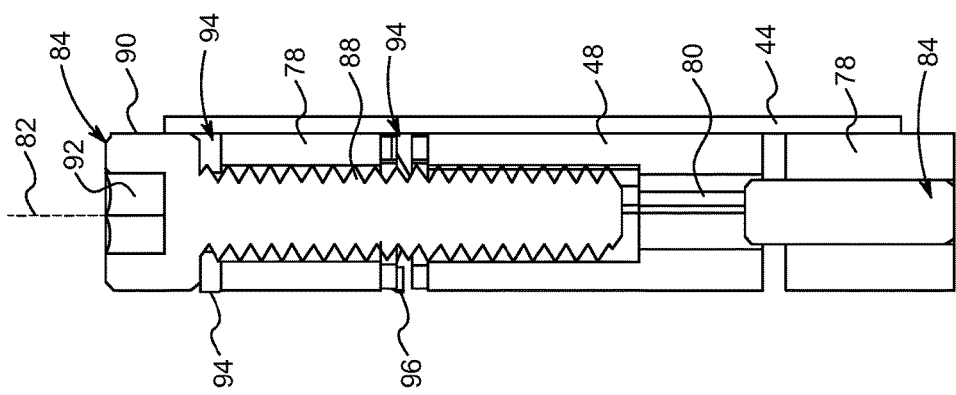
FIG. 19 is an exploded view of a hinge.
Figure 20:
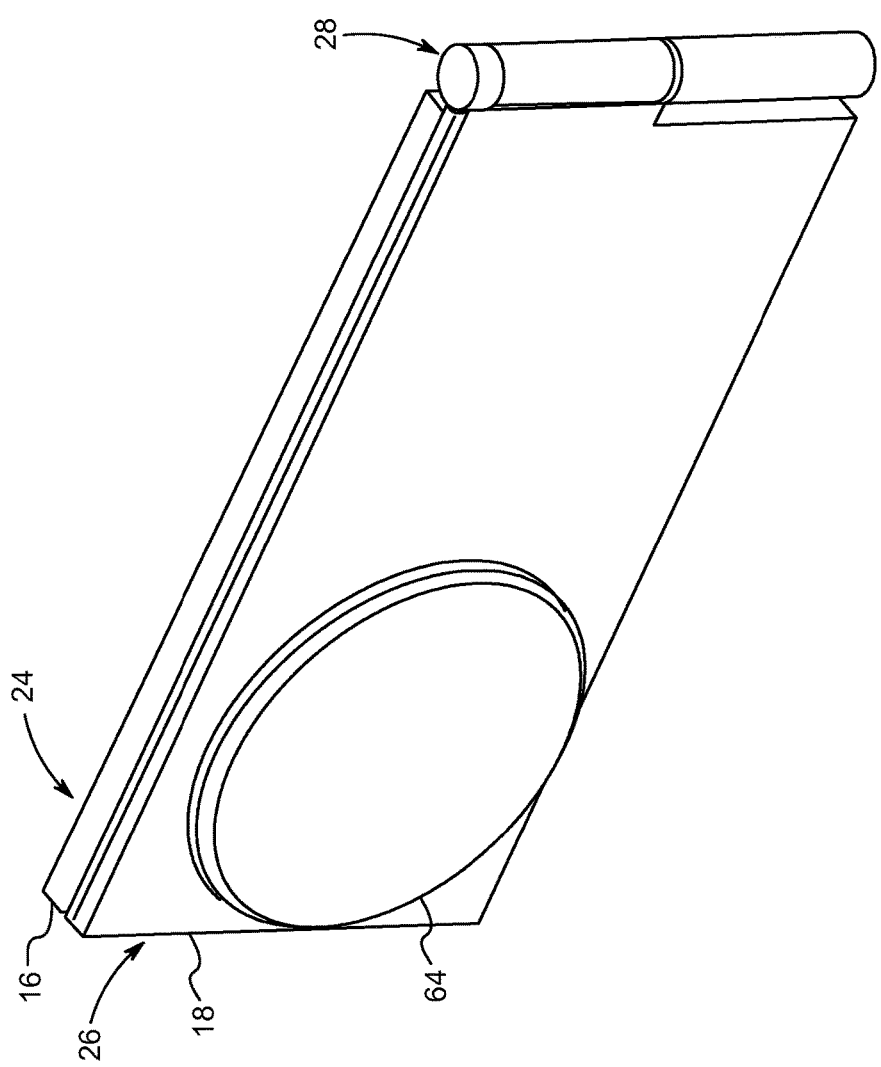
FIG. 20 is a close-up perspective view of a folding handheld device holding system having the connecting arm lay flat against the extension arm.
Figure 21:
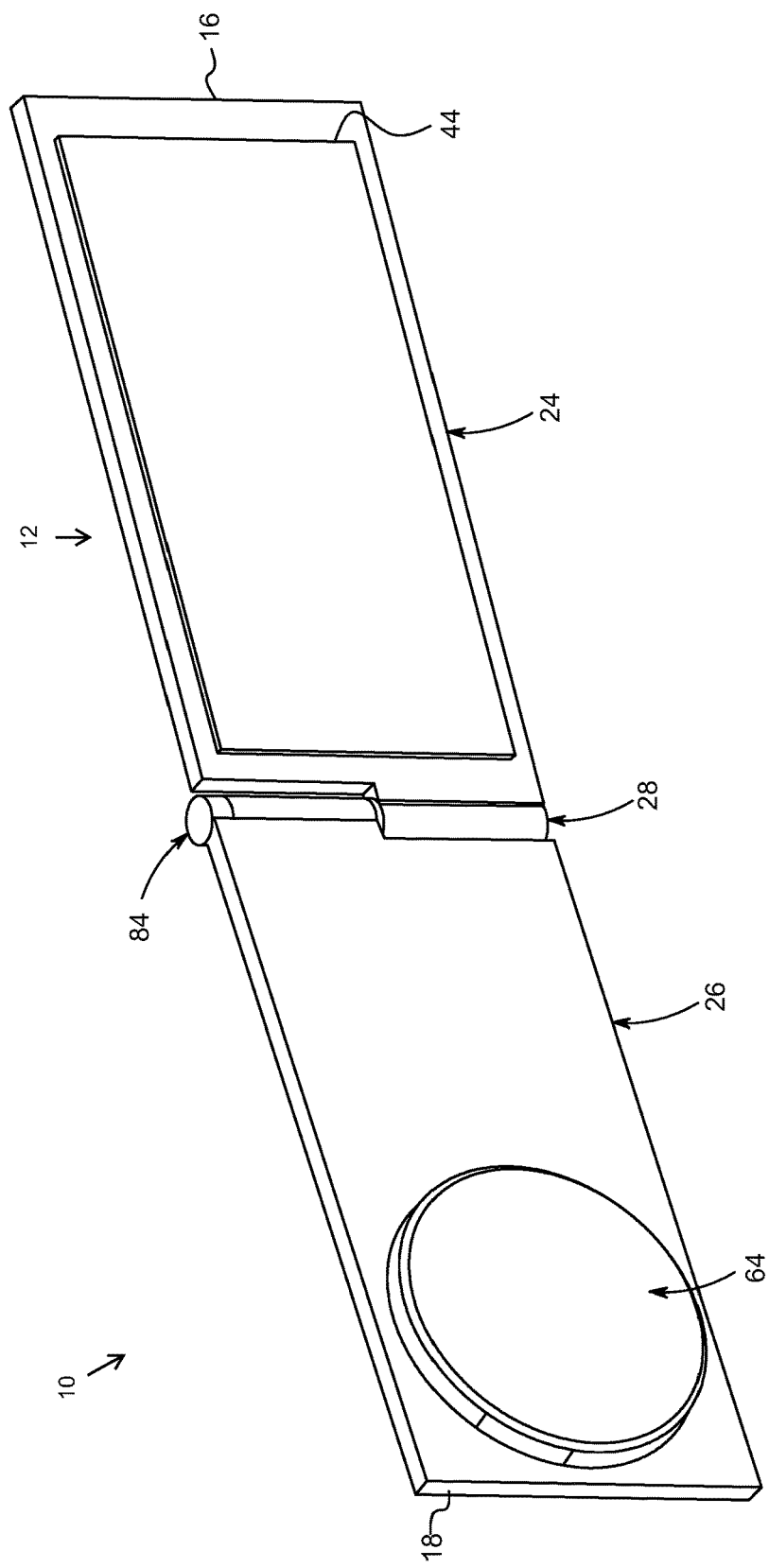
FIG. 21 is a close-up perspective view of a front of the folding handheld device holding system having the connecting arm and the extension arm in the extended position.
Figure 22:
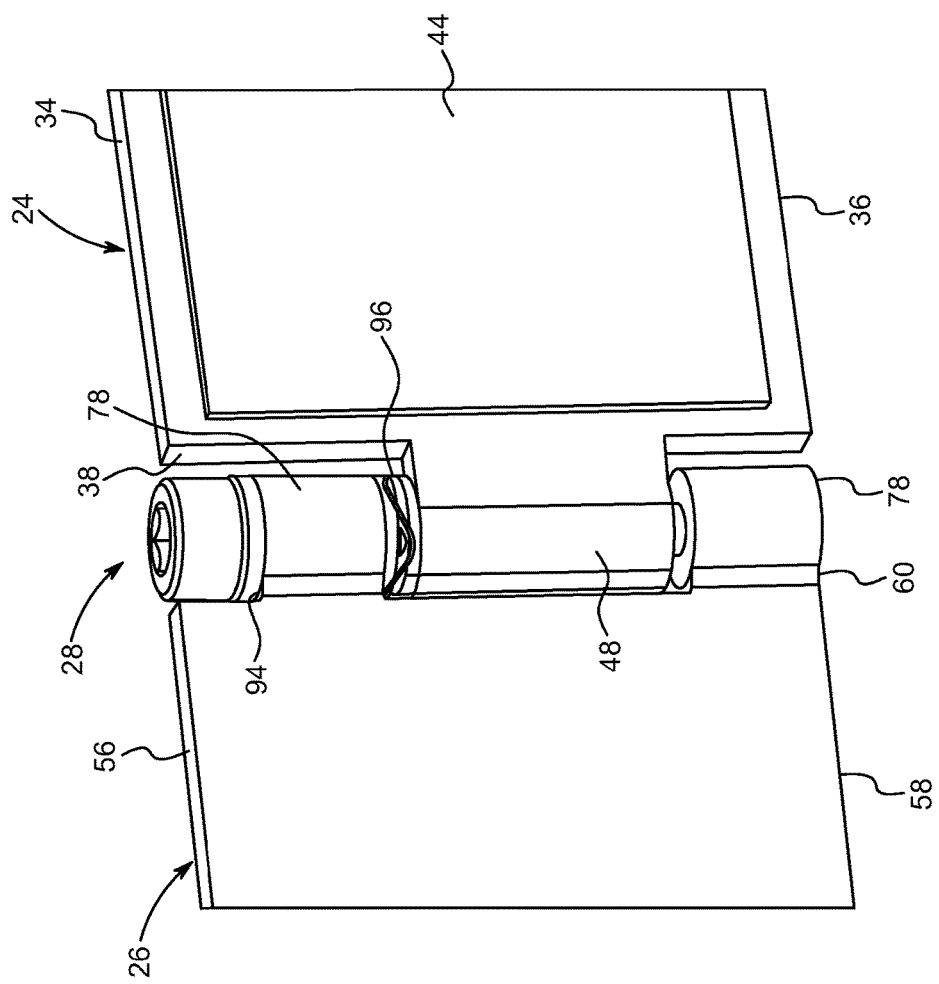
FIG. 22 is a close-up perspective view of the hinge connected to the connecting arm and the extension arm.
Figure 23:
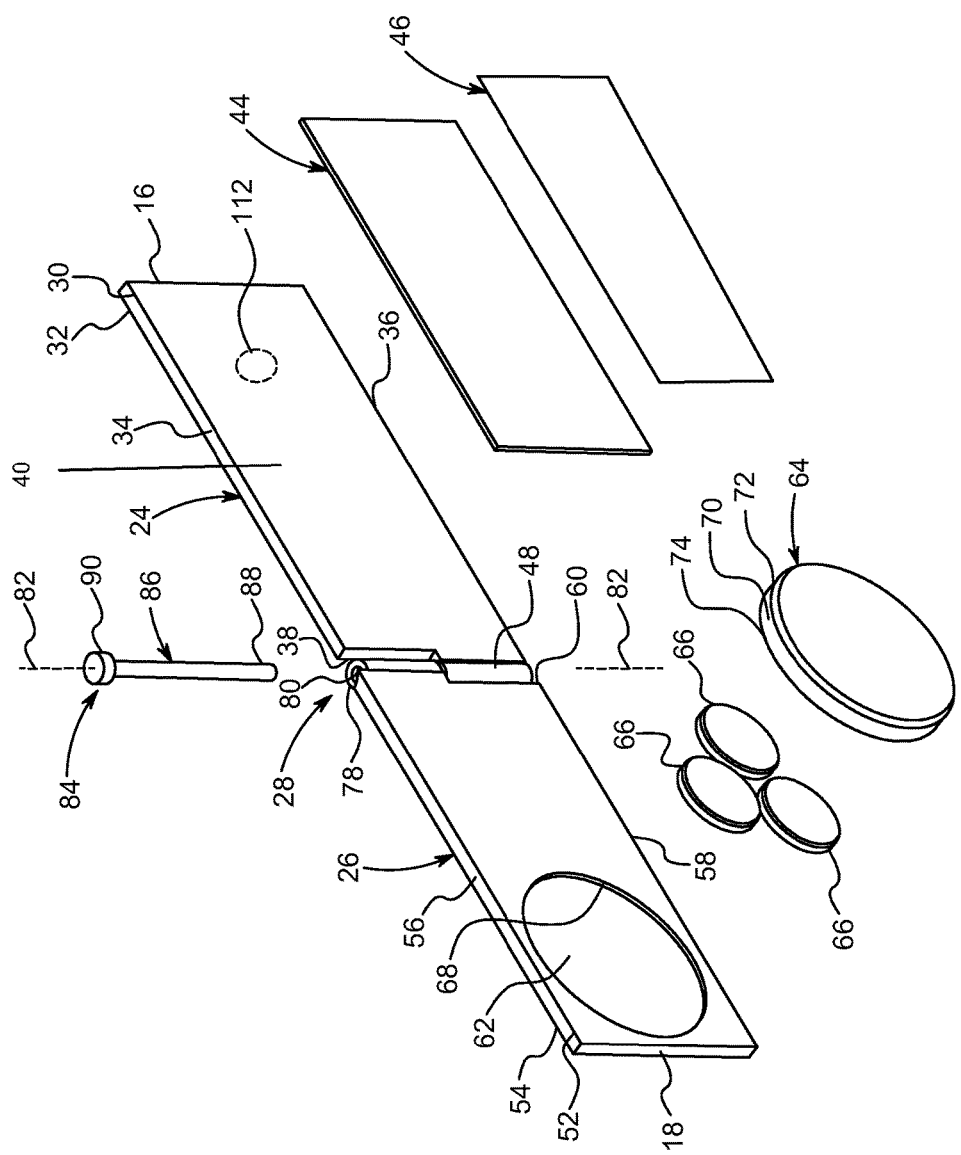
FIG. 23 is a front perspective view of the elements of a folding handheld device holding system which demonstrates how the elements are integrated with one another.
Figure 24:
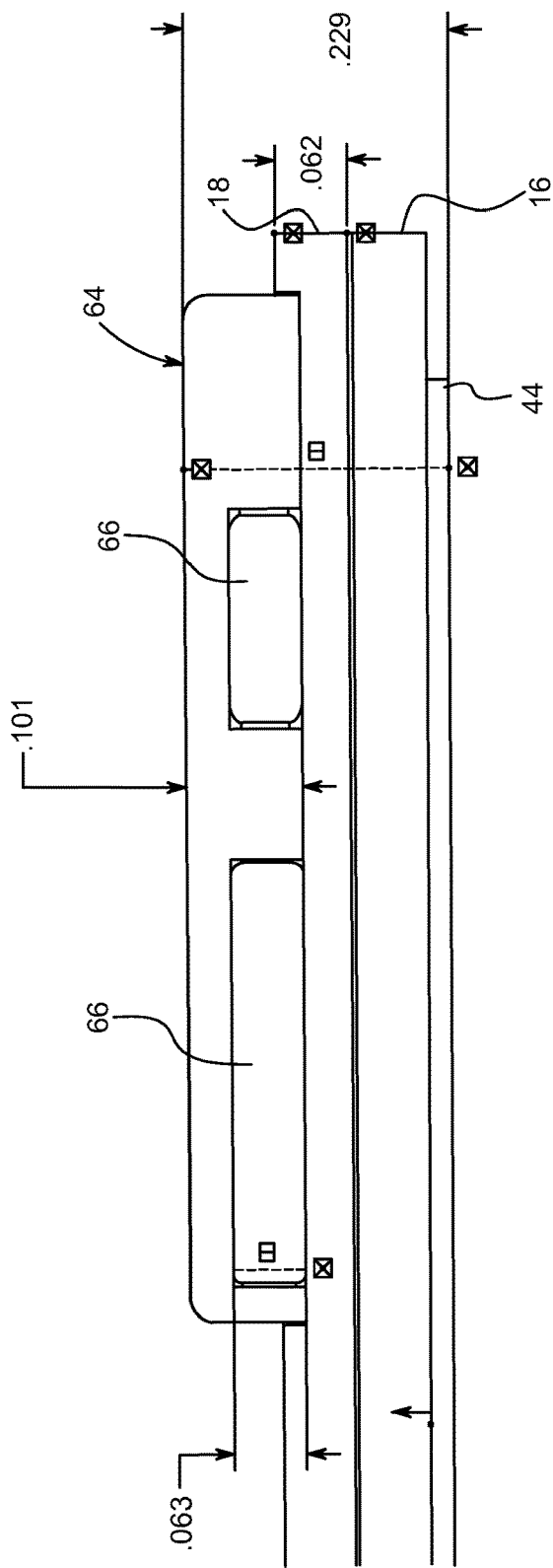
FIG. 24 is a close-up perspective view of the side of the connecting arm lying flat against the extension arm and the cover.
Figure 25:
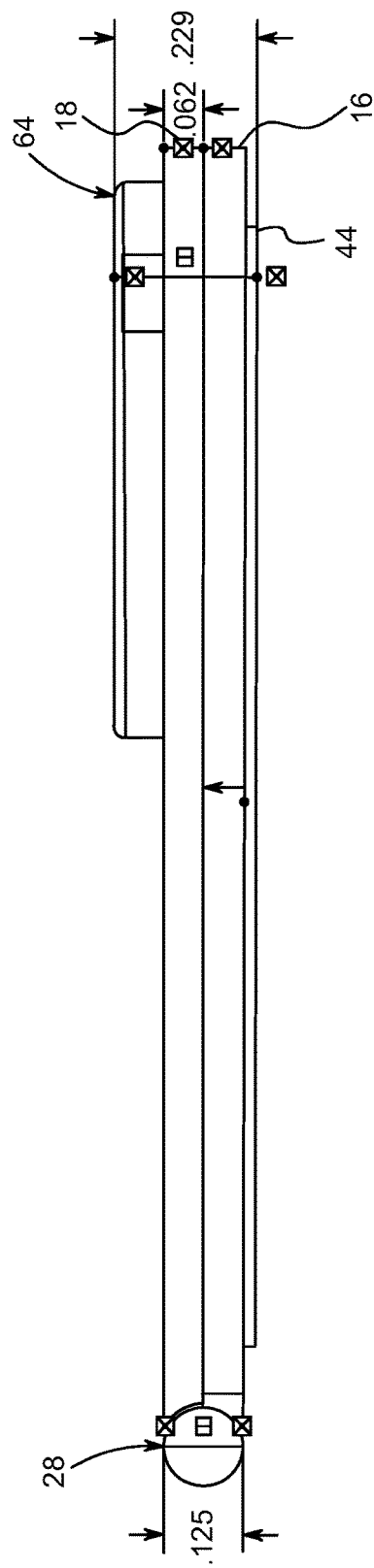
FIG. 25 is a close-up perspective view of a folding handheld device holding system having the connecting arm lay flat against the extension arm.
Figure 28:
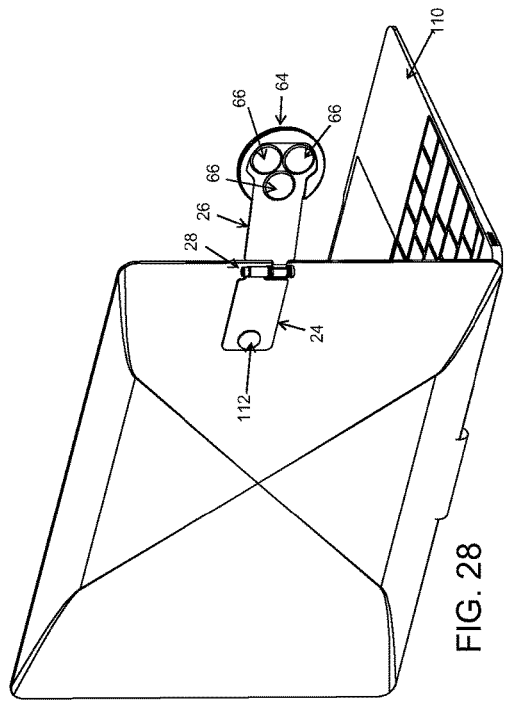
FIG. 28 is a rear perspective view of a folding handheld device holding system connected to a monitor with the extension arm in an extended position.
Figure 30:
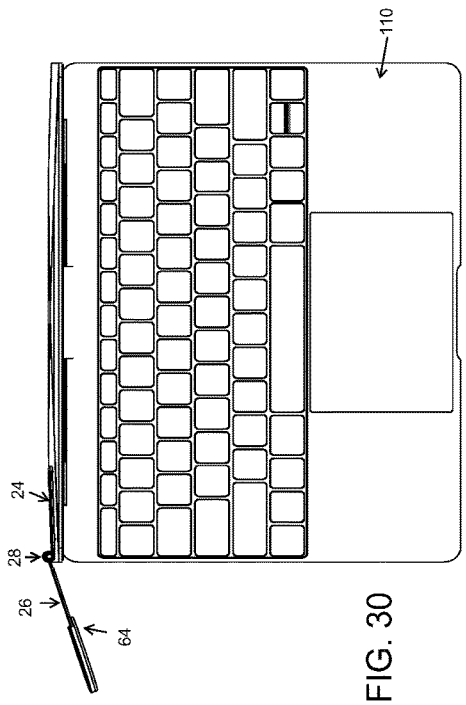
FIG. 30 is a top perspective view of a folding handheld device holding system connected to a monitor with the extension arm in an extended position.
Figure 27:
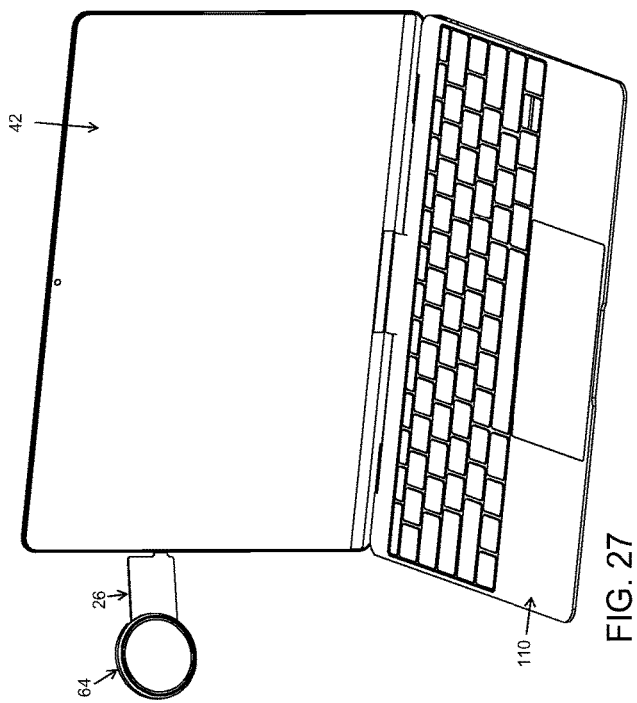
FIG. 27 is a front perspective view of a folding handheld device holding system connected to a monitor with the extension arm in an extended position.
Figure 29:
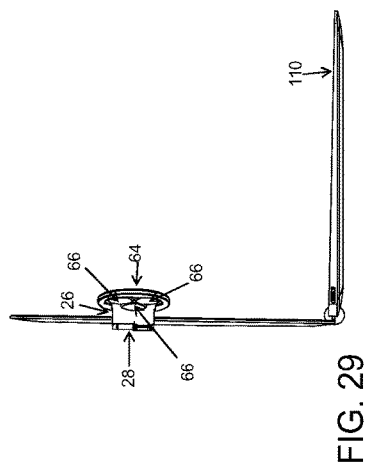
FIG. 29 is a side perspective view of a folding handheld device holding system connected to a monitor with the extension arm in an extended position.
Figure 32:
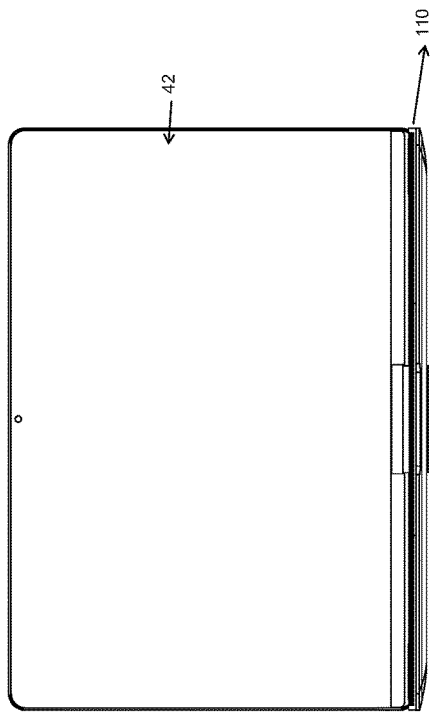
FIG. 32 is a front perspective view of a folding handheld device holding system connected to a monitor with the extension arm being in a retracted position.
Figure 33:
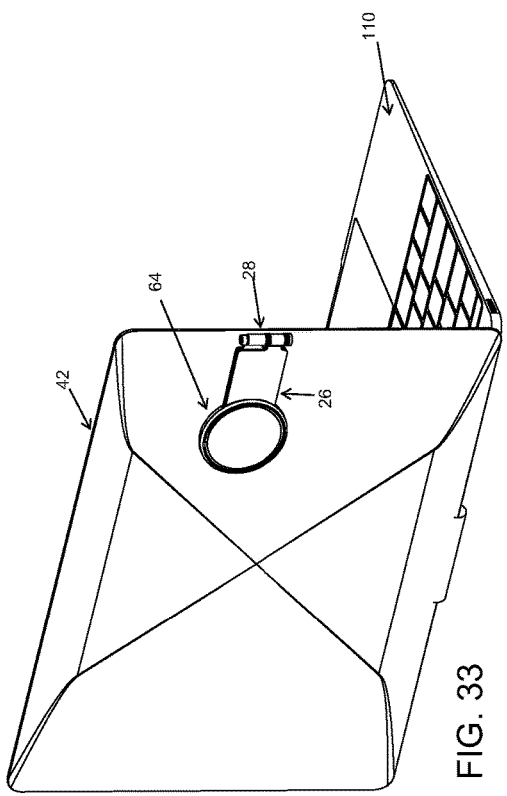
FIG. 33 is a side perspective view of a folding handheld device holding system connected to a monitor with the extension arm being in a retracted position.
Figure 31:
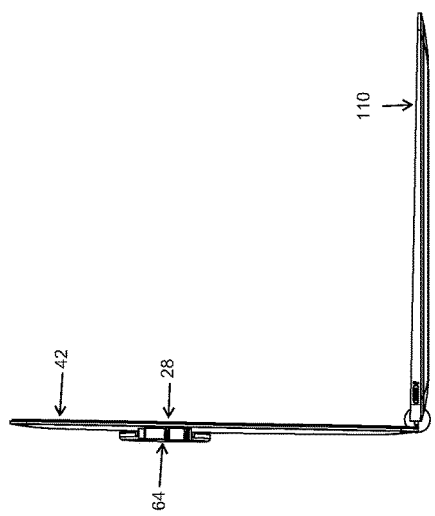
FIG. 31 is a side perspective view of a folding handheld device holding system connected to a monitor with the extension arm being in a retracted position.
Figure 34:
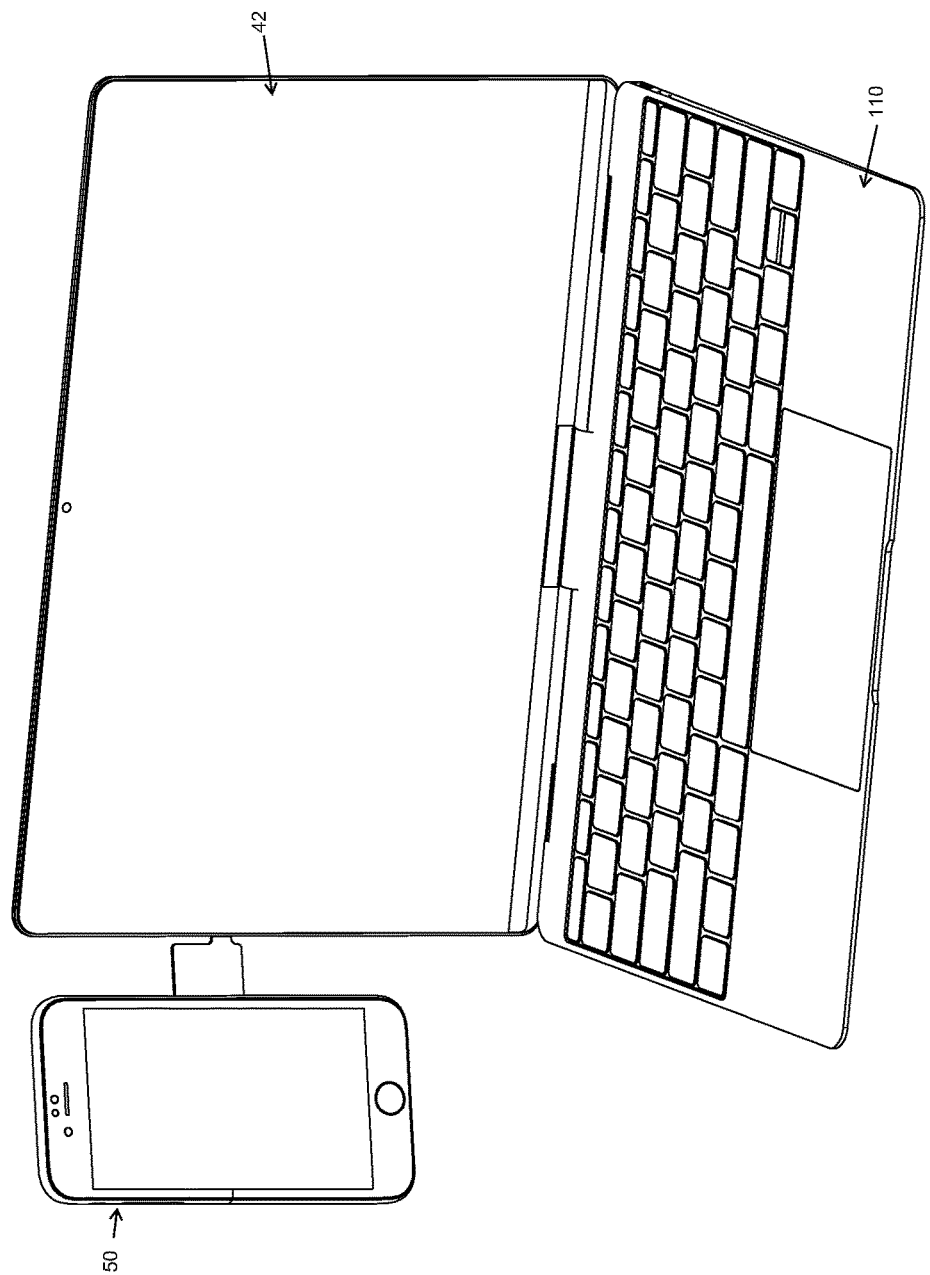
FIG. 34 is a front perspective view of a folding handheld device holding system connected to a monitor with the extension arm being in an extended position with a smart phone connected to the extension arm.
Figure 35:
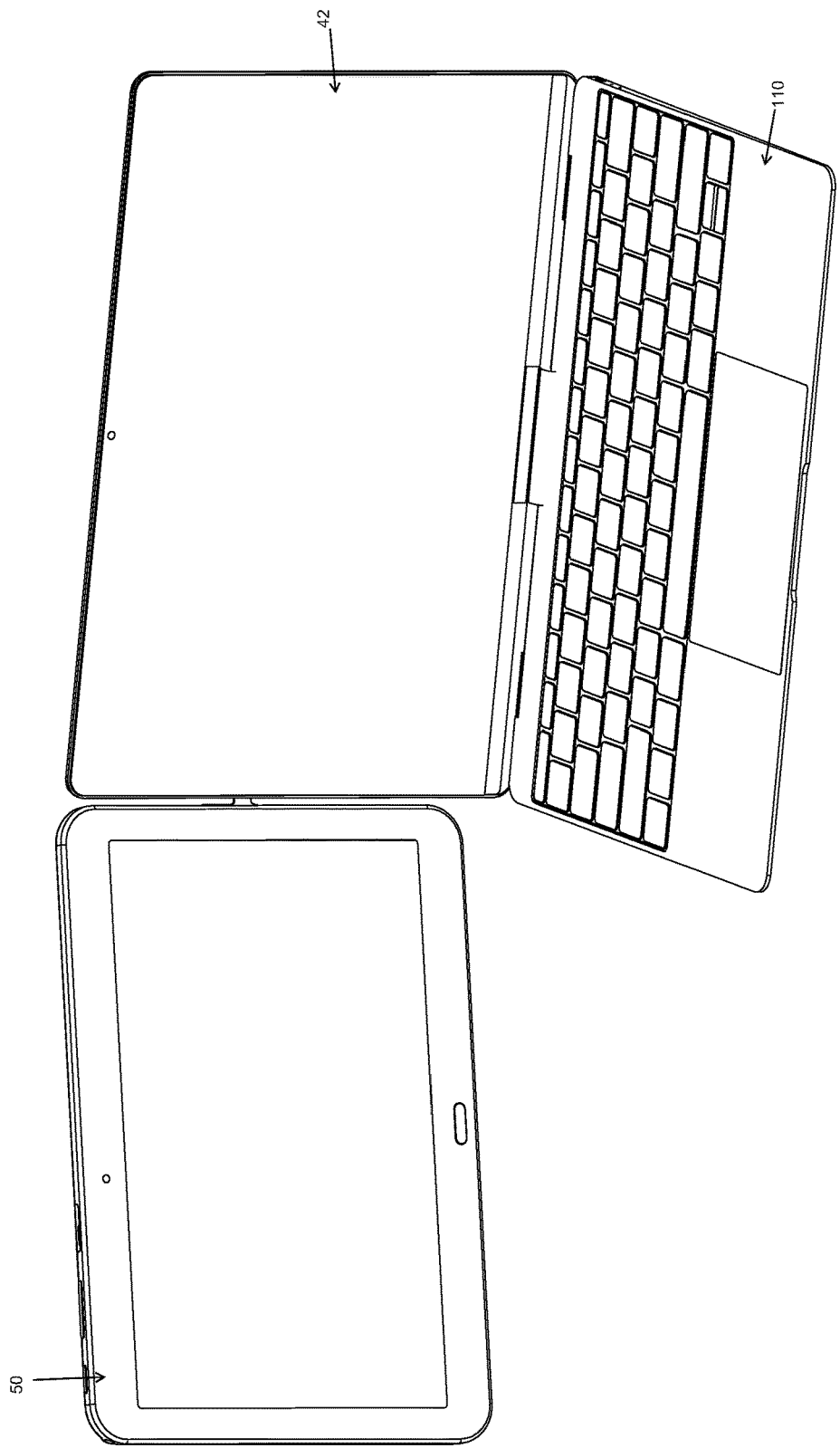
FIG. 35 is a front perspective view of a folding handheld device holding system connected to a monitor with the extension arm being in an extended position with a tablet connected to the extension arm.
Figure 36:
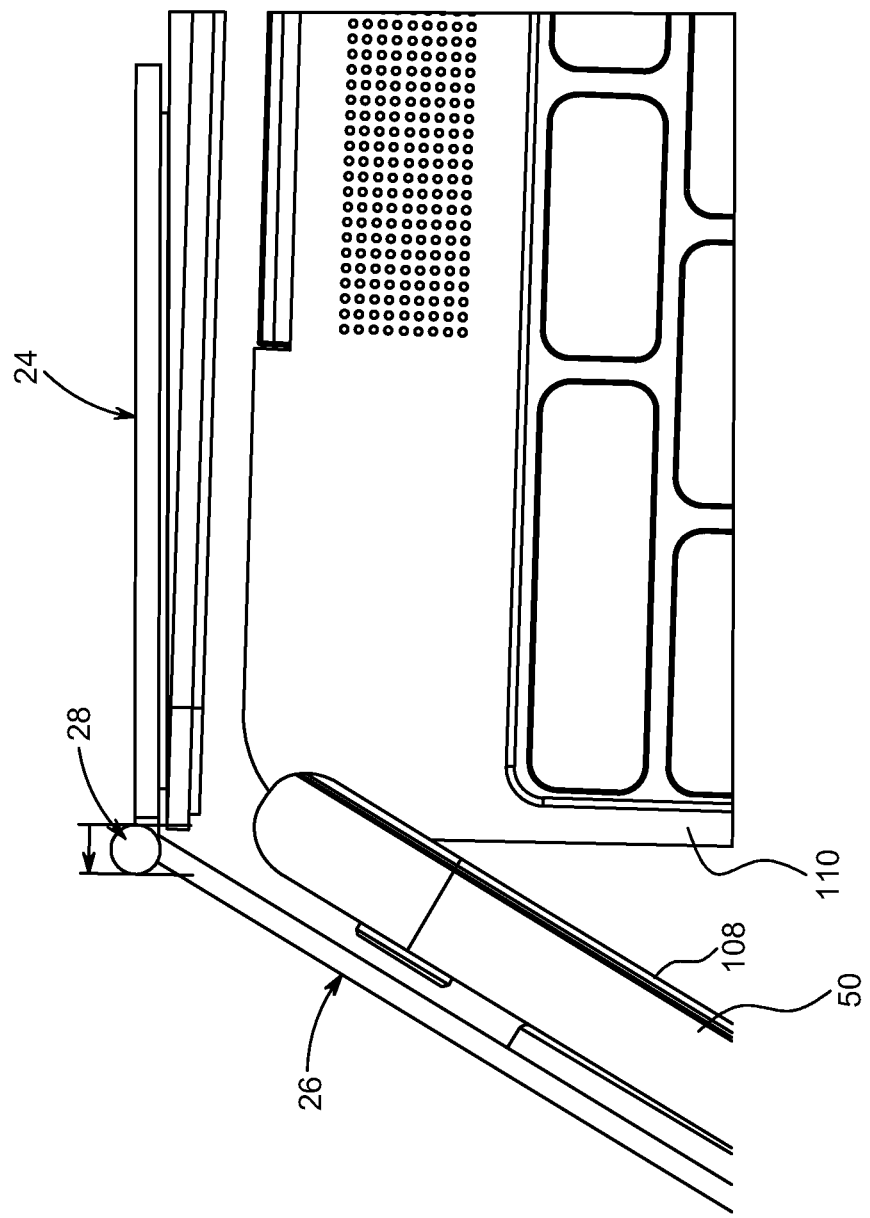
FIG. 36 is a close-up top perspective view of a folding handheld device holding system connected to a monitor with the extension arm being in an extended position with the extending arm positioned around the monitor.
Figure 37:
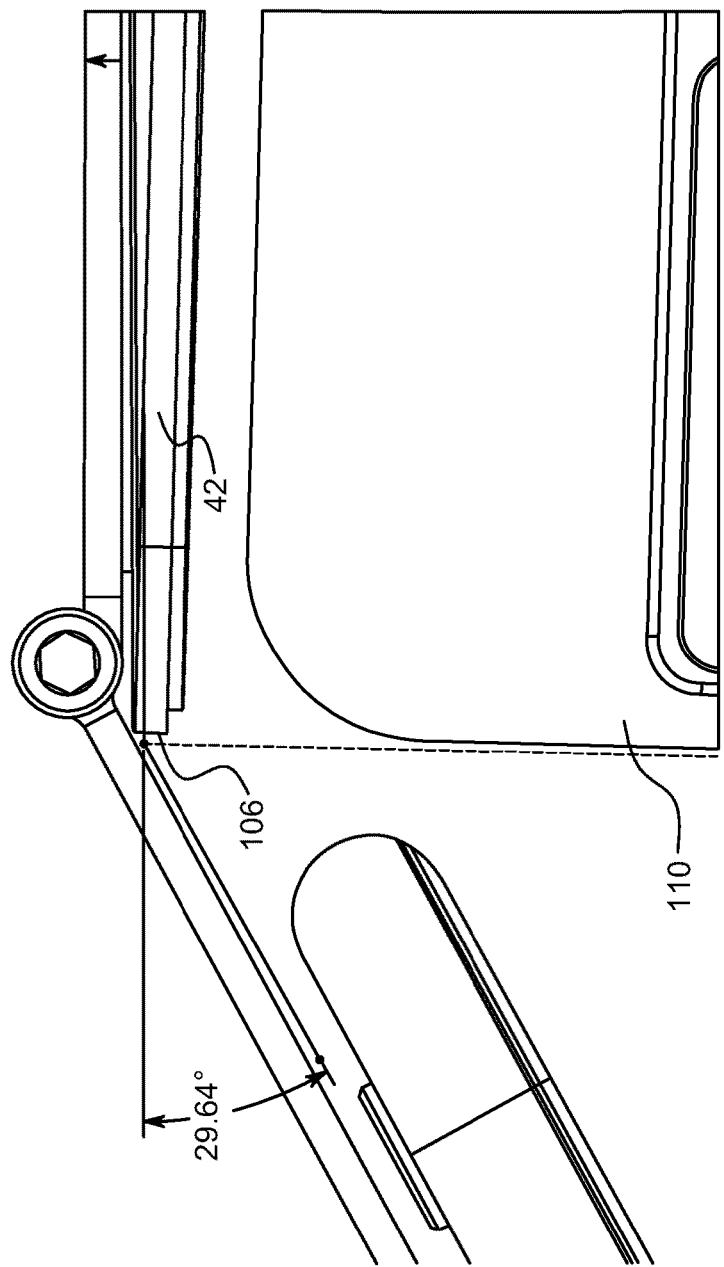
FIG. 37 is a close-up top perspective view of a folding handheld device holding system connected to a monitor with the extension arm being in an extended position positioned around the monitor.
Figure 38:
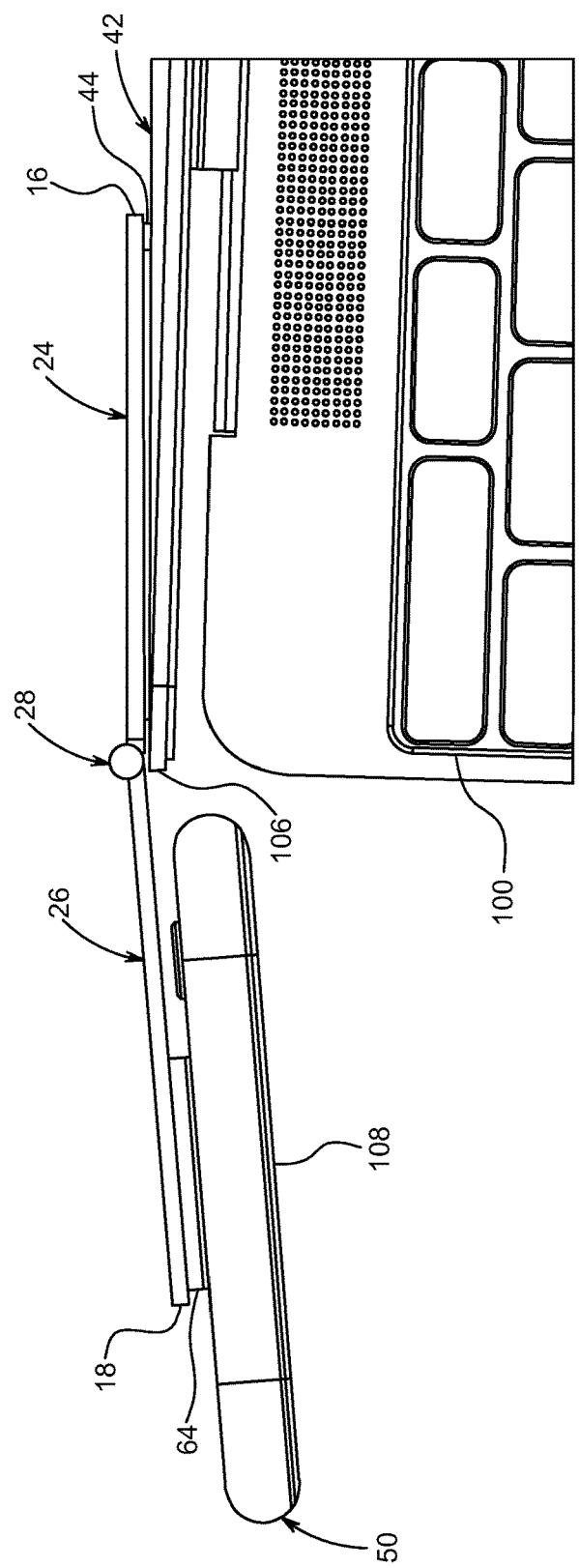
FIG. 38 is a close-up top perspective view of a folding handheld device holding system connected to a monitor with the extension arm being in an extended position in a linear direction.
Figure 39:
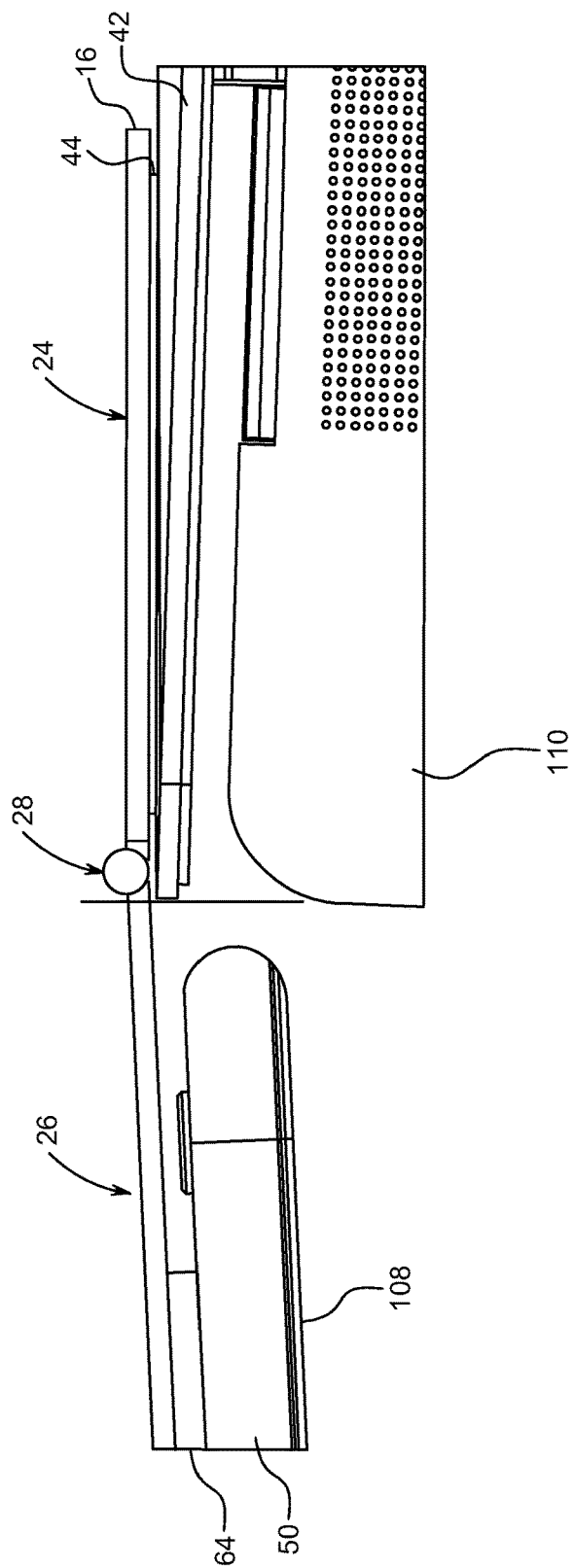
FIG. 39 is a close-up top perspective view of a folding handheld device holding system connected to a monitor with the extension arm being in an extended position in a linear direction.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure (s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Also, as used herein, the term "handheld device", or similar language, is to be broadly construed to include devices such as cell phones, smart phones, tablets, handheld computers, music playing devices (such as MP3 players, iPods and the like), video playing devices, videogame devices and digital cameras, or any other handheld electronic device. Additionally, as used herein, the term "handheld device", or similar language, is to be broadly construed to include other devices such as web cams, pencil sharpeners, desk supply holders, or any other type of good to provide convenience to a user. As such, the term "handheld device" as used herein is to be construed broadly and is meant to describe these and any other handheld device. While the figures, and some examples, may show use of the folding handheld device holding system with a cell phone/smart phone, this is only an example and there should be no implication that the system is limited to use with only these handheld devices. In one arrangement, the term handheld device is intended to mean any electronic device that includes a screen or display, however in other arrangements the handheld device does not include a screen or display.

Also, while the figures and description herein show use of the system in association with a conventional lap top or a conventional desktop computer screen, this is only one of countless examples and is not meant to be limiting. Instead, it is to be understood that the system may be used in any application, and with any device, and is not limited to lap top or desktop computers.

With reference to the figures, a folding handheld device holding system 10 is presented. System 10 is formed of any suitable size, shape and design. In the arrangement shown, as one example, system 10 has a forward side 12, a rearward side 14, an interior end 16, an exterior end 18, an upper side 20, and a lower side 22. The system 10 includes a connecting arm 24 and an extension arm 26 that are connected to one another by a hinge 28.

Connecting arm 24 is formed of any suitable size, shape, and design and serves to connect system 10 to the back side of, or any other portion of, a computer monitor or other device. In the arrangement shown, as one example, connecting arm 24 is generally rectangular in shape and has a generally flat forward face 30 that extends in generally parallel spaced relation to a generally flat rearward face 32. Connecting arm 24 extends vertically between a generally flat upper edge 34 that extends in generally parallel spaced relation to a generally flat lower edge 36. Connecting arm 24 extends laterally between interior end 16 and exterior edge 38. Being generally rectangular in shape, upper edge 34 and lower edge 36 intersect interior end 16 and exterior edge 38 in generally perpendicular or square alignment. Similarly, being generally rectangular in shape, the planes formed by forward face 30 and rearward face 32 intersect the upper edge 34 and lower edge 36, and interior end 16 and exterior edge 38, in generally perpendicular or square alignment.

Connecting arm 24 includes connecting section 40 that serves to connect connecting arm 24 to the back side of a monitor 42 or other device. In the arrangement shown, connecting section 40 is a section of the forward face 30 of connecting arm 24. In the arrangement shown, adhesive 44 is connected to connecting section 40 and serves to adhesively connect connecting section 40 to the back side of monitor 42. Adhesive 44 is any form of an adhesive or adhesive device that serves to adhesively connect or bond two components together. In one arrangement, adhesive 44 is a layer of glue, paste, cement, mucilage, paste, two-sided-tape, two-sided-foam-tape, or any other form of adhesive or bonding agent that serves to physically and adhesively bond connecting arm 24 to monitor 42. In the arrangement shown, adhesive 44, like connecting arm 24, is generally rectangular in shape and is sized and shaped to cover a majority of the forward face 30 of connecting arm 24. In the arrangement shown, the boundaries of adhesive 44 terminate just before the upper edge 34, lower edge 36, interior end 16, and exterior edge 38 of connecting arm 24. In this way, maximum surface area of forward face 30 is provided for adhesive 44 so as to facilitate maximum bonding between connecting section 40 and monitor 42.

In some arrangements, it is desirable to have adhesive 44 be compressible, or partially compressible. That is, a compressible adhesive 44, such as a thick layer of partially viscous, flowable, or malleable adhesive, or a two-sided-foam-tape or the like, accommodates surface variabilities in the surface that is being connected to, such as features, textures, designs, or the like. This compressibility allows for optimum adhesion between connecting arm 24 and monitor 42 or other device to which system 10 is being connected to.

In one arrangement, adhesive 44 is applied to connecting section 40 during the manufacturing process and the forward surface of adhesive 44 is covered with a removable film 46. When the user receives system 10, the user determines the location that system 10 is to be attached to monitor 42 or other device. Once the attachment location is determined, the user removes removable film 46 and places the newly exposed forward face of adhesive 44 onto the monitor 42 or other device which it is to be attached to. Once the connecting section 40 is connected to the monitor 42 or other device, the user applies pressure thereby ensuring adhesive 44 forms an optimal bond with the monitor 42 or other device to which it is connected. In the arrangement wherein the adhesive 44 is compressible, and the surface to which the adhesive 44 is applied is not flat, when pressure is applied, the compressible adhesive 44 compresses and accommodates the surface variability thereby optimizing adhesion.

In the arrangement shown, a portion of hinge 28 is connected to exterior edge 38. More specifically, a barrel 48 is connected to the lower portion of exterior edge 38. While only a single barrel 48 is shown, any number of barrels are hereby contemplated for use. Hinge 28 and the arrangement and components thereof is further described herein.

Extension arm 26 is formed of any suitable size, shape and design and serves to move between a retracted position, wherein the extension arm 26 lays flat against the connecting arm 24 and is hidden behind the monitor 42, and an extended position, wherein the extension arm 26 extends away from the connecting arm 24 and extends outwardly from behind the monitor 42. The extension arm 26 also serves to receive and hold a handheld device 50. In the arrangement shown, as one example, extension arm 26 is generally rectangular in shape and has a generally flat forward face 52 that extends in generally parallel spaced relation to a generally flat rearward face 54. Extension arm 26 extends vertically between a generally flat upper edge 56 that extends in generally parallel spaced relation to a generally flat lower edge 58. Extension arm 26 extends laterally between exterior end 18 and interior edge 60. Being generally rectangular in shape, upper edge 56 and lower edge 58 intersect exterior end 18 and interior edge 60 in generally perpendicular or square alignment. Similarly, being generally rectangular in shape, the planes formed by forward face 52 and rearward face 54 intersect the upper edge 56 and lower edge 58, and exterior end 18 and interior edge 60, in generally perpendicular or square alignment. However, any other configuration is hereby contemplated for use.

Extension arm 26 includes a recess 62 therein that is sized and shaped to receive a cover 64 and one or more magnets 66 therein. Recess 62 is formed of any suitable size, shape and design and serves to locate and connect cover 64 and magnets 66 therein. In the arrangement shown, as one of countless examples, recess 62 is generally circular in shape, however any other shape is hereby contemplated for use such as square, rectangular, triangular, octagonal, hexagonal, heptagonal, oval, or any other shape. In the arrangement shown, recess 62 is positioned at or near the exterior end 18 of extension arm 26 so as to provide the greatest amount of distance between monitor 42 and handheld device 50, with only a thin amount of material between the outward most edge of recess 62 and exterior end 18. By being recessed, recess 62 serves a locating function. That is, cover 64 is easily assembled with extension arm 26 by inserting cover 64 within recess 62. In addition, the step 68 that forms the edge of recess 62 provides additional surface area for connection between cover and extension arm 26, thereby improving the robustness of the connection there between. To maximize the area for cover 64 and magnets 66, the step 68 or boundary of recess 62 is positioned just inward from exterior end 18 and upper edge 56 and lower edge 58 of extension arm 26. In addition, by being recessed into extension arm 26, recess 62 provides the additional benefit of reducing the profile of, or the front-to-back thickness of the system 10 as the depth of recess 62 accommodates a portion of the depth of cover 64 and magnets 66. This is a benefit as a low profile is beneficial in many applications, especially when used in association with portable laptop computers.

Cover 64 is formed of any suitable size, shape and design and serves to hold and cover magnets 66 as well as to connect to recess 62 of extension arm 26. Cover 64 is sized and shaped to fit within recess 62, and therefore the depth of recess 62 accommodates a portion of the depth of cover 64, which helps to keep the profile of system 10 to a minimum. In the arrangement shown, wherein recess 62 is circular in nature, cover 64 is similarly circular in shape with the exterior edge 70 of cover 64 being sized and shaped to frictionally engage with close and tight tolerances the step 68 of recess 62.

Cover 64 has a generally flat and planar front surface 72 that extends in generally parallel spaced relation to a generally flat and planar back surface 74. In the arrangement shown, back surface 74 includes a number of magnet recesses 76 therein that are sized and shaped to receive magnets 66 therein with close and tight tolerances. In the arrangement shown, magnets 66 and magnet recesses 76 are circular or disk-shaped. Magnets 66 may be held within magnet recesses 76 by any manner or means such as by frictional engagement, snap fit features, the use of adhesives, or any other method or manner or any combination thereof. In the arrangement shown, while three magnets 66 and magnet recesses 76 are shown, any number of magnets 66 and magnet recesses 76 are hereby contemplated for use and may be used, such as one, two, four or more. While magnets 66 are formed of a magnetic metallic material, cover 64 is formed of a plastic or composite material.

One benefit to this arrangement is that a thin layer of the material that forms cover 64 covers the forward face of magnets 66. This thin layer of covering material helps to hold magnets 66 within magnet recesses 76, and allows the magnetic forces of magnets 66 to transmit through the cover material. This thin layer of covering material over magnets 66 also provides for an improved aesthetic appearance. In addition, by placing a thin layer of covering material over the forward surface of magnets 66, this does not inhibit the magnets ability to magnetically hold handheld device 50, but it does allow for easier removal of handheld device 50 from magnets 66.

Cover 64 having magnets 66 therein is connected to recess 62 by any manner, method, or means. That is, cover 64 may be held within recess 62 by any manner or means such as by frictional engagement, snap fit features, the use of adhesives, welding or any other method or manner or any combination thereof. This provides a rigid, strong, durable and robust arrangement. In addition, by placing cover 64 within recess 62, this not only provides a precise location for cover 64 within extension arm 26, the step 68 provides increased surface area between recess 62 and cover 64 thereby improving the strength of connection between the two components.

In the arrangement shown, a portion of hinge 28 is connected to interior edge 60 of extension arm 26. More specifically, a barrel 78 is connected to the upper portion of interior edge 60. While only a single barrel 78 is shown, any number of barrels are hereby contemplated for use. Hinge 28 and the arrangement and components thereof is further described herein.

Hinge 28 is formed of any suitable size, shape and design and serves to allow the system 10 to move between a retracted position, wherein the extension arm 26 lays flat against the connecting arm 24 and is hidden behind the monitor 42, and an extended position, wherein the extension arm 26 extends away from the connecting arm 24 and extends outwardly from behind the monitor 42. In the arrangement shown, as one of many examples, hinge 28 is formed of a barrel 48 connected to the lower end of exterior edge 38 of connecting arm 24, and a barrel 78 connected to the upper end of interior edge 60 of extension arm 26. Barrels 48, 78 include an opening 80 therein and serve to form an axis of rotation 82 that extends through their middle. While two barrels are shown that form hinge 28, any number of barrels are hereby contemplated for use such as three, four, five or more.

A hinge pin 84 is sized and shaped to fit within the opening 80 of barrels 48, 78 thereby holding connecting arm 24 and extension arm 26 to one another while simultaneously allowing for rotation or folding of one of connecting arm 24 and extension arm 26 with respect to the other of connecting arm 24 and extension arm 26. In the arrangement shown, hinge pin 84 includes a shaft 86 having a threaded section 88 and a head 90 thereon. In one arrangement, head 90 includes a rotation feature 92 therein that serves to help facilitate rotation of hinge pin 84, such as a hex head, an Allen key, a square key, a flat head key, or any other feature that helps to facilitate rotation of hinge pin 84.

Hinge 28 provides both the ability to change positions, as well as sufficient resistance to maintain a set position. That is, it is desirable for hinge 28 to provide enough resistance against rotation such that the system 10 maintains the position that it is moved to while not having so much resistance that it is difficult to move the system 10 between a retracted position, wherein the extension arm 26 lays flat against the connecting arm 24 and is hidden behind the monitor 42, and an extended position, wherein the extension arm 26 extends away from the connecting arm 24 and extends outwardly from behind the monitor 42. In one arrangement, a sufficient amount of resistance is built within the inherent configuration of the hinge 28. In another arrangement, the amount of resistance is adjustable by rotating hinge pin 84—to increase resistance, hinge pin 84 is tightened, to reduce resistance hinge pin 84 is loosened.

In one arrangement, to improve the adjustability of the friction created in hinge 28, as is shown, three barrels 48, 78 are used, two barrels 78 connected to extension arm 26 with one on the upper side and one on the lower side of the extension arm 26, and one centrally located barrel 48 connected to connecting arm 24. In this arrangement, a washer 94 is positioned between the upper end of the upper barrel 78 and the lower edge of head 90, and a friction device 96 is positioned between at least one of the upper or lower barrels 48 and the centrally located barrel 48. Friction device 96 is formed of any suitable size, shape and design and is configured to impart friction between connecting arm 24 and extension arm 26. In one arrangement, as is shown, friction device 96 is formed of a spring washer. In this arrangement, as the hinge pin 84 is tightened, this pulls the upper barrel 78 of extension arm 26 closer to the centrally located barrel 48 of connecting arm 24 thereby compressing the friction device 96 spring washer. As the friction device 96 is increasingly compressed, an increasing amount of friction is generated which resists movement. The hinge pin 84 is tightened until the optimum amount of friction is generated which allows for relatively easy movement of extension arm 26 while providing enough resistance to maintain a set position. Any other friction imparting device can be used in place of a spring washer, such as a compressible member, a detent system, a spring, or the like.

As most handheld devices 50 are not formed of or contain an appreciable amount of magnetic or ferrous material, system 10 includes a metallic member 100 that is configured to be attached to handheld device 50 so as to facilitate connection to the magnets 66 of extension arm 26. Metallic member 100 is formed of any suitable size, shape and design and serves to provide enough magnetic or ferrous material to handheld device 50 so as to facilitate a strong and repeatable connection between the handheld device 50 and the magnets 66 of extension arm 26. In one arrangement, as is shown, metallic member 100 is formed of a single plate of metallic material, such as iron or steel, or the like that is placed on the back side of handheld device 50. In the arrangement shown, metallic member 100 is configured to be placed between the back side of handheld device 50 and cover 102 that covers handheld device 50. In one arrangement, metallic member 100 includes an adhesive 104. This adhesive 104 is used to adhesively attach metallic member 100 to the back side of handheld device 50 itself. Alternatively this adhesive 104 is used to adhesively attach metallic member 100 to the insides surface of cover 102, which allows the use of metallic member 100 without the need to attach the metallic member directly to handheld device 50. In yet another alternative arrangement, no adhesive is used and instead, metallic member 100 is simply positioned between handheld device 50 and cover 102 and is held in place there between.

In the arrangement shown, metallic member 100 is relatively thin and generally flat and planar in shape and has a rectangular or square profile. This provides a thin device, while also providing sufficient mass and surface area to form a strong magnetic connection with magnets 66. In one arrangement, metallic member 100 is formed of a single piece, whereas in contrast in other arrangements, metallic member 100 is formed of multiple pieces.

In one arrangement, metallic member 100 is made of a non-magnetic, but ferrous, material that is attracted to magnets 66. In an alternative arrangement, metallic member 100 is itself magnetic. In the arrangement where metallic member 100 is magnetic, this provides a stronger connection with magnets 66 of extension arm 26 as the magnetic metallic member 100 and the magnets 66 pull toward one another. In this arrangement wherein metallic member 100 is itself magnetic, care is taken to ensure that the poles of magnets 66 of extension arm 26 and the pole of magnetic metallic member 100 (when only a single member is used) or the poles of magnetic metallic members 100 (when multiple of magnetic metallic members 100 are used) are aligned to attract one another rather than repel one another. Again, using a magnetic metallic member 100 provides a greater strength of connection to extension arm 26. In addition, magnets tend to be self-centering when they attract toward one another. As such, using a magnet on both extension arm 26 as well as handheld device 50 provides alignment as well as stronger hold, and using multiple magnets on both extension arm 26 as well as handheld device 50 provides greater alignment as well as stronger hold.

Assembly: Folding handheld device holding system 10 is attached to the back of monitor 42, of a desktop computer, a laptop computer, or any other device in the following manner. The location and position of system 10 is determined on the monitor 42 and once the proper location is determined, the removable film 46 is removed from adhesive 44 of connecting arm 24. Once the adhesive 44 is removed, the adhesive 44 is pressed into the rear surface of monitor 42 which causes adhesion between adhesive 44 and monitor 42. In the arrangement, wherein adhesive 44 is partially flowable, malleable, or otherwise partially compressible, upon this pressure, the adhesive 44 deforms to accommodate variability in the surface to which it is being attached thereby maximizing the surface area of adhesion and strength of adhesion. In many arrangements, such as when used on a laptop, it is desirable to place connecting arm 24 in a position such that in a retracted or folded position, the extension arm 26 does not protrude past the edge 106 of monitor 42; whereas in an extended position, the extension arm 26 extends a distance past the edge 106 of monitor 42.

Similarly, metallic member 100 is attached to handheld device 50. In one arrangement, metallic member 100 is adhesively attached directly to handheld device 50. In another arrangement, metallic member 100 is adhesively attached to a cover 102 connecter to handheld device 50 (this may be between the cover 102 and the handheld device 50, or on an exterior surface of cover 102). Once attached, metallic member 100 serves as the metallic piece that facilitates magnetic connection to the magnets 66 of extension arm 26.

In Operation: Once the system 10 is attached to monitor 42, the system 10 is moved from a retracted position, wherein the extension arm 26 is in flat, flush, and folded condition with connection arm 24, to an extended position by grasping extension arm 26 and pivoting movement of the extension arm 26 with respect to connecting arm 24 upon hinge 28. In doing so, a user applies a rotational force that is greater than the friction in hinge 28. Once extension arm 26 is in the desired position, with the exterior end 18 of extension arm 26 positioned past the edge 106 of monitor 42, the user stops applying rotational force. Once this rotational force ceases, the friction of hinge 28 maintains the position of the extension arm 26 in an extended position.

Once in an extended position, handheld device 50 having metallic member 100 attached thereto is placed within magnetic attraction distance to the exterior end 18 of extension arm 26. Once within close proximity, the magnets 66 contained within cover 64 magnetically attract metallic member 100. This causes the rearward surface of handheld device 42 to frictionally, directly, and magnetically engage the front surface 72 of cover 64. In this position, the magnetic pull, and magnetic connection between magnets 66 and metallic member 100 is greater than the weight of handheld device 50 and as such the handheld device 50 is held in place on the end of extension arm 26.

In this position, the screen 108 of handheld device 50 is easily visible adjacent the screen of monitor 42. The angle of the handheld device 50 can be easily adjusted by applying rotational force to extension arm 26, thereby changing the angle of the extension arm 26 and therefore the angle of the handheld device 50. This can be helpful when positioning the angle of a camera when conducting a video call, or when glare is on the screen 108 of the handheld device 50. The extension arm 26 can be positioned at any angle between being folded flat with connecting arm 24, and a maximum angle wherein the forward side of extension arm 26 engages an edge 106 of monitor 42.

When held in place by extension arm 26, handheld device 50 can be easily plugged into the computer 110 or monitor 42 to which it is connected to by way of wired connection, such as for example by connecting to a USB plug on the monitor 42 or computer 110. In this way, the handheld device 50 may be both powered by the monitor 42 or computer 110 as well as share information with monitor 42 or computer 110. This arrangement can even allow or enable a handheld device 50 to be used as a screen sharing device or enable screen sharing between the monitor 42 or computer 110 and the handheld device 50.

When handheld device 50 is attached to extension arm 26, the location and position of the handheld device 50 is constantly known, and the handheld device 50 is constantly visible, including the information displayed on screen 108 of handheld device 50, such as incoming text messages, and the like. This provides a convenience as the user can easily see the handheld device 50 and is not required to search for their handled device 50 when a message is received.

When the user is done using the handheld device 50 in association with computer 110 or monitor 42, the user simply grasps the handheld device 50 and removes it from extension arm 26. In doing so, the user applies a force greater than the force of magnetic attraction between magnets 66 and metallic member 100. Once separated, the extension arm 26 can be moved to a retracted position by applying a rotational force greater than the friction created by hinge 28. The extension arm 26 is moved upon hinge 28 until the rearward face 54 of extension arm 26 lays flat against and in engagement with the rearward face 32 of connecting arm 24.

This retracted position is maintained by the friction of hinge 28. To help keep the extension arm 26 in this retracted position, in one arrangement, a metallic member or magnet 112 is positioned on or in connecting arm 24 at or near where the cover 64 of extension arm 26 overlaps connecting arm 24 in the retracted position. In this position, the magnets 66 of cover 64 help to magnetically hold to the metallic member or magnet 112 thereby holding the extension arm 26 in a retracted position, which is desirable in many applications, such as when attached to a laptop that is often thrown into a briefcase.

It will be appreciated that various configurations of folding handheld device holding systems 10 may be employed, each for use with different handheld devices 50. That is, a folding handheld device holding systems 10 configured to hold a cell phone handheld device 50 may be smaller and have less magnetic force than a folding handheld device holding system 10 configured to hold a larger tablet or tablet computer. These modifications are hereby contemplated and do not depart from the spirit and scope of the disclosure.

From the above discussion, it will be appreciated that a folding handheld device holding system and method of use is presented and improves upon the state of the art.

Specifically, the folding handheld device holding system and method of use is presented that: is easy to use; is small; improves the efficiency of using a computer; improves the efficiency of using a handheld device; improves the convenience of using a computer; improves the convenience of using a handheld device; can be used with a wide variety of handheld devices; can be used with a wide variety of computers; eliminates the need to search for the location of a handheld device; is relatively inexpensive; has a long, useful life; has a small footprint; is high quality; is durable; does not interfere with use of the handheld device; does not interfere with use of the computer; allows a handheld device to be quickly attached; allows a handheld device to be quickly detached; is adjustable; does not require any tools to be used for assembly; places a handheld device in a convenient position, among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A folding handheld device holding system comprising:
a connecting arm;
the connecting arm extending a length from a first end to a second end;
an extension arm;
the extension arm extending a length from a first end to a second end;
a hinge;
wherein the connecting arm and the extension arm are connected to one another by the hinge;
at least one magnet;
the at least one magnet connected to the extension arm;
a connecting section;
the connecting section connected to the connecting arm;
wherein the connecting section is configured to connect the connecting arm to a monitor having a display;
adhesive connected to the connecting section, wherein the adhesive is configured to connect the connecting section to a monitor having a display;
a user's electronic device;
the user's electronic device having a display;
wherein the extension arm is configured to hold the user's electronic device adjacent the monitor such that the display of the user's electronic device is adjacent the display of the monitor;
wherein the connecting arm and the extension arm move between an extended position and a folded position;
wherein when in the folded position the connecting arm and the extension arm are positioned in a flat, overlapping condition;
wherein in the folded position the at least one magnet of the extension arm holds the extension arm and the connecting arm in the folded position.

2. The folding handheld device holding system of claim 1 wherein the at least one magnet consists of a plurality of magnets.

3. The folding handheld device holding system of claim 1 further comprising a cover to hold and cover the at least one magnet.

4. The folding handheld device holding system of claim 1 wherein a first barrel connects a portion of the hinge to an interior edge of the extension arm and a second barrel connects a portion of the hinge to an exterior edge of the connecting arm.

5. The folding handheld device holding system of claim 1 wherein the hinge provides enough friction to hold its position.

6. The folding handheld device holding system of claim 1 wherein a first plurality of barrels connects a portion of the hinge to an interior edge of the extension arm and a second plurality of barrels connects a portion of the hinge to an exterior edge of the connecting arm.

7. The folding handheld device holding system of claim 1 wherein the extension arm moves between a retracted position and an extended position.

8. The folding handheld device holding system of claim 1 wherein when the extension arm is in a retracted position the extension arm folds behind the display of the monitor.

9. The folding handheld device holding system of claim 1 further comprising a metallic member placed between the user's electronic device and a cover of the user's electronic device to facilitate a strong and repeatable connection between the user's electronic device and the at least one magnet of the extension arm.

10. The folding handheld device holding system of claim 1 further comprising a metallic member connected to the user's electronic device or a cover of the user's electronic device to facilitate a strong and repeatable connection between the user's electronic device and the at least one magnet of the extension arm.

11. The folding handheld device holding system of claim 1 further comprising a metallic member connected to the user's electronic device or a cover of the user's electronic device wherein the metallic member is formed of a non-magnetic, but ferrous, material that is attracted to magnets.

12. The folding handheld device holding system of claim 1 further comprising a metallic member connected to the user's electronic device or a cover of the user's electronic device or placed between the user's electronic device and a cover of the user's electronic device wherein the metallic member is formed of a magnetic material.

13. The folding handheld device holding system of claim 1 wherein the adhesive consists of a layer of glue, paste, cement, mucilage, paste, two-sided tape, two-sided-foam-tape, or any other form of adhesive or bonding agent that serves to physically and adhesively bond the connecting arm to the monitor.

14. The folding handheld device holding system of claim 1 wherein the user's electronic device is a smart phone or a tablet.

15. A folding handheld device holding system comprising:
a connecting arm;
the connecting arm extending a length from a first end to a second end;
an extension arm;
the extension arm extending a length from a first end to a second end;
a hinge;
wherein the connecting arm and the extension arm are connected to one another by the hinge;
at least one connecting member;
the at least one connecting member connected to the extension arm;
a connecting section;
the connecting section connected to the connecting arm;
wherein the connecting section is configured to connect the connecting arm to a monitor having a display;
adhesive connected to the connecting section, wherein the adhesive is configured to connect the connecting section to a monitor having a display;
a user's electronic device;
the user's electronic device having a display;
wherein the extension arm is configured to hold the user's electronic device adjacent the monitor such that the display of the user's electronic device is adjacent the display of the monitor;
wherein the connecting arm and the extension arm move between an extended position and the folded position;
wherein when in the folded position the connecting arm and the extension arm are positioned in a flat, overlapping condition;
wherein when in the folded position the at least one magnet of the extension arm holds the extension arm and the connecting arm in a folded position.

16. A folding handheld device holding system of claim 15 wherein the at least one connecting member is a magnet.

* * * * *